United States Patent
Yasui et al.

(10) Patent No.: US 7,451,739 B2
(45) Date of Patent: Nov. 18, 2008

(54) IGNITION TIMING CONTROL SYSTEM AND METHOD FOR INTERNAL COMBUSTION ENGINE, AND ENGINE CONTROL UNIT

(75) Inventors: Yuji Yasui, Saitama-ken (JP); Ikue Kawasumi, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/713,722

(22) Filed: Mar. 5, 2007

(65) Prior Publication Data

US 2007/0235007 A1   Oct. 11, 2007

(30) Foreign Application Priority Data

Apr. 11, 2006   (JP) ............... 2006-108570

(51) Int. Cl.
- F02P 5/15   (2006.01)
- F02D 13/02  (2006.01)
- F02D 15/02  (2006.01)
- G06F 17/00  (2006.01)

(52) U.S. Cl. ............... 123/406.23; 123/406.19; 701/102

(58) Field of Classification Search ............ 123/406.19, 123/406.23; 701/102, 110

See application file for complete search history.

(56) References Cited

U.S. PATENT DOCUMENTS 6,039,023 A * 3/2000 Cullen et al. ........... 123/339.23
6,834,638 B2 * 12/2004 Lee ..................... 123/406.23
6,932,053 B2 * 8/2005 Ichihara et al. ............. 123/350
7,143,741 B2 * 12/2006 Yagi ..................... 123/339.11

FOREIGN PATENT DOCUMENTS

| JP | 03172554 A | * | 7/1991 |
| JP | 6-248988 A |  | 9/1994 |
| JP | 2005-315161 A |  | 11/2005 |
| JP | 2006-29194 A |  | 2/2006 |

* cited by examiner

Primary Examiner—Willis R. Wolfe, Jr.
(74) Attorney, Agent, or Firm—Arent Fox LLP.

(57) ABSTRACT

An ignition timing control system for an internal combustion engine, which is capable of reducing the capacity of a memory that stores data used in controlling ignition timing, thereby reducing manufacturing costs. An ignition timing control system that controls ignition timing of an internal combustion engine calculates a maximum torque parameter indicative of a maximum torque that the engine can output when the engine is at the detected rotational speed, according to the detected rotational speed, calculates an output torque parameter indicative of an output torque being output from the engine, calculates a torque ratio as a ratio between the output torque parameter and the maximum torque parameter, and determines the ignition timing according to the engine speed and the torque ratio.

9 Claims, 25 Drawing Sheets

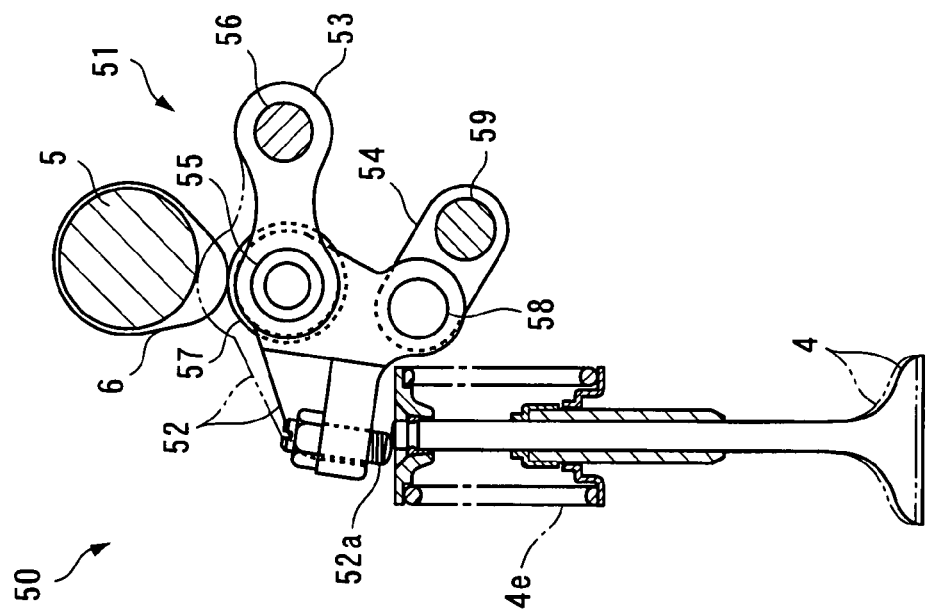
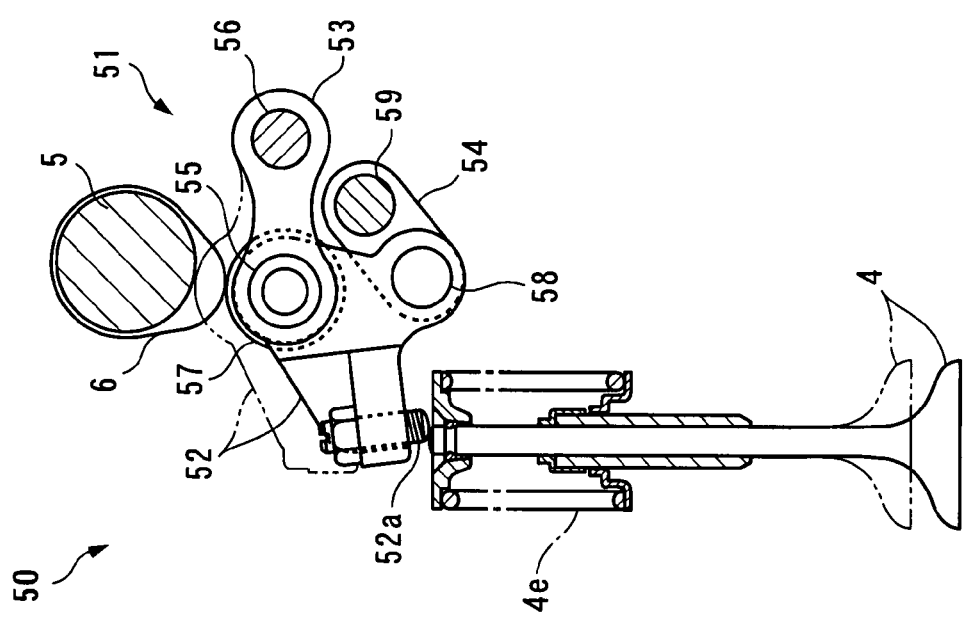

Cain=Cainref & Cr=Crmin

Cain=Cainref & Cr=Crmax

IGNITION TIMING CONTROL SYSTEM AND METHOD FOR INTERNAL COMBUSTION ENGINE, AND ENGINE CONTROL UNIT

BACKGROUND OF THE INVENTION

1. Field of the Invention

The present invention relates to an ignition timing control system for controlling ignition timing of an internal combustion engine, a method thereof, and an engine control unit.

2. Description of the Related Art

A conventional ignition timing control system for an internal combustion engine is disclosed e.g. in Japanese Laid-Open Patent Publication (Kokai) No. 2005-315161. The engine is provided with a variable valve actuating mechanism that opens and closes intake valves and changes the maximum lift of the intake valves. In this engine, by controlling the maximum lift of the intake valves using the variable valve actuating mechanism, the amount of intake air is controlled. Further, the conventional control system determines ignition timing in the following manner: the engine speed and the amount of intake air are detected, and based on the detected engine speed, the maximum value of the amount of intake air that can be drawn when the engine is at the detected engine speed (hereinafter referred to as "the maximum intake air amount") is calculated. Further, the ratio between the detected amount of intake air and the calculated maximum intake air amount is calculated, and the ignition timing is determined according to this ratio and the detected engine speed.

On the other hand, one of known variable valve actuating mechanisms is configured, as shown in FIG. 7, such that the opening timing of the intake valves is advanced and the closing timing of the same is retarded as the maximum lift Liftin is larger. FIG. 35 shows an example of control of the ignition timing in the case where this type of variable valve actuating mechanism is employed. As shown in FIG. 35, as the maximum lift Liftin is larger, the intake air amount is increased to accordingly increase the output torque, which tends to make knocking more liable to occur, and hence, to avoid this problem, the ignition timing is determined to be retarded.

Further, when the maximum valve lift is a first predetermined value La, the ignition timing is determined to be a first predetermined ignition timing Ia, whereas when the maximum valve lift is larger than the first predetermined value La, it is determined to be advanced as the maximum lift Liftin is larger, and when the same is larger than a second predetermined value Lb larger than the first predetermined value La, it is determined to be a second predetermined ignition timing Ib more advanced than the first predetermined ignition timing Ia. The reason for this is as follows: As the maximum lift Liftin is larger, the opening timing of the intake valves becomes more advanced, whereby the amount of exhaust gases remaining within each cylinder (hereinafter referred to as "internal EGR gas") increases, and the closing timing of the same becomes more retarded, whereby the amount of air returned into the intake pipe from within the cylinder increases. Thus, as the amount of internal EGR gas increases, the combustion temperature lowers to lower the temperature of the cylinder wall, which lowers the temperature of the mixture, and the compression ratio of the engine lowers due to the increase of the amount of return air. The lowered temperature of the mixture and the reduced compression ratio of the engine makes knocking difficult to occur.

Further, as described above, when the maximum lift Liftin ≧ the first predetermined value La holds, the amount of return air is larger as the maximum lift Liftin is larger. However, by determining the ignition time such that it is more advanced, the combustion ratio of the engine becomes higher, which increases the output torque of the engine. Further, due to the increase in the amount of return air, the actual intake air amount assumed when the maximum lift Liftin is equal to the second predetermined value Lb becomes equal to a predetermined value GREF, which is equal to the intake air amount to be assumed when the maximum valve Liftin is equal to the first predetermined value La. As a consequence, as shown in FIG. 36, when the amount of intake air is equal to the predetermined value GREF, there are two ignition timings suited thereto: first ignition timing Ia and second ignition timing Ib.

The conventional ignition timing control system described above, however, determines ignition timing according to the intake air amount. Therefore, assuming that when the intake air amount is equal to the predetermined value GREF, the first ignition timing Ia on the retarded side is determined as the ignition timing so as to avoid occurrence of knocking, if the actual valve lift Liftin is equal to the second predetermined value Lb, knocking would not occur even if the ignition timing is determined to be the second ignition timing Ib. In spite of this, since the ignition timing is determined to be the first ignition timing Ia, it is impossible to obtain a high combustion efficiency, which reduces output torque of the engine.

To avoid such an inconvenience, it can be envisaged to control the ignition timing according to the maximum lift Liftin and the engine speed. In this case, however, there arises the following problems: When determining the ignition map by searching a map according to the maximum lift Liftin, in a region of the maximum lift Liftin (hereinafter referred to as "the knock lift region") where load on the engine is high and knocking is liable to occur, to prevent occurrence of knocking, it is necessary to increase the number of grid points to which map values of ignition timing are set. On the other hand, even if the maximum lift Liftin is the same, the intake air amount varies with the engine speed, and hence as shown in FIG. 37, as the engine speed varies between low and high, there are different knock lift regions (areas enclosed by broken lines) which as a whole forms a very wide region. As a result, it is necessary to set map values for the very wide knock lift region as described above, the number of settings of map values (number of grid points indicated by black dots) becomes too large, and hence the capacity of a memory required by the ignition timing control system becomes too large, resulting in an increase in the manufacturing costs of the ignition timing control system.

SUMMARY OF THE INVENTION

The present invention has been made to provide a solution to the above-described problem, and an object thereof is to provide an ignition timing control system for controlling ignition timing of an internal combustion engine, a method thereof, and an engine control unit, which are capable of reducing the capacity of a memory that stores data used in controlling ignition timing, thereby enabling reduction of manufacturing costs.

To attain the above object, the present invention provides an ignition timing control system for controlling ignition timing of an internal combustion engine, comprising rotational speed-detecting means for detecting rotational speed of the engine, maximum torque parameter-calculating means for calculating a maximum torque parameter indicative of maximum torque that the engine can output when the engine is at the detected rotational speed, according to the detected rotational speed, output torque parameter-calculating means for calculating an output torque parameter indicative of output torque being output from the engine, torque ratio-calculating means for calculating a torque ratio as a ratio of one of the calculated maximum torque parameter and the output torque parameter to the other, and ignition timing-determining means for determining the ignition timing according to the rotational speed of the engine and the calculated torque ratio.

With the configuration of the ignition timing control system according to the first aspect of the present invention, the maximum torque parameter indicative of the maximum torque that the engine can output when the engine is at the detected rotational speed is calculated by the maximum torque parameter-calculating means. Further, the output torque parameter indicative of the output torque of the engine is calculated by the output torque parameter-calculating means, and the torque ratio as the ratio between the maximum torque parameter and the output torque parameter is calculated by the torque ratio-calculating means. Further, the ignition timing is determined according to the calculated torque ratio and the rotational speed by the ignition timing-determining means.

As described above, since the torque ratio is calculated as the ratio between the maximum torque that the engine can output at the detected rotational speed and the output torque, the ratio becomes close to 1 in a high-load region where knocking is liable to occur, irrespective of the rotational speed of the engine. Therefore, a region of the torque ratio where knocking is liable to occur is where the ratio is in a range of values equal or close to 1. Therefore, e.g. in determining the ignition timing using a map set using the torque ratio and the rotational speed as parameters, compared with the case where the aforementioned maximum lift is used as a parameter, it is possible to reduce the range of the torque ratio where map values are required to be set in a detailed manner. As a result, it is possible to reduce the number of map values to be set, and hence it is possible to reduce the capacity of a memory required by the ignition timing control system, and the man-hours for preparing the maps, thereby enabling reduction of manufacturing costs of the ignition timing control system.

Preferably, the engine is provided with a variable valve actuating mechanism that is capable of changing at least one of a maximum valve lift of an intake valve, opening timing of the intake valve, and closing timing of the intake valve, and the ignition timing control system further comprises operating state parameter-detecting means for detecting an operating state parameter indicative of an operating state of the variable valve actuating mechanism, wherein at least one of the maximum torque parameter and the output torque parameter is calculated according to the detected operating state parameter.

The variable valve actuating mechanism changes at least one of the maximum lift of an intake valve, the opening timing of the same, and the closing timing of the same, and hence as the operating state of the variable valve actuating mechanism changes, the intake air amount changes to change the output torque and the maximum torque. With the configuration of the preferred embodiment, the maximum torque parameter and/or the output torque parameter is/are calculated according to the detected operating state parameter indicative of the operating state of the variable valve actuating mechanism. Therefore, it is possible to appropriately determine the ignition timing according to the actual operating state of the variable valve actuating mechanism.

Further, when the variable valve actuating mechanism is of the above-mentioned type which advances the opening timing of the intake valve and retards the closing timing of the same as the maximum lift is larger, differently from the conventional system which uses the intake air amount, there does not occur such a phenomenon in which there are two appropriate ignition timings for the same output torque, as apparent from FIG. 35. Therefore, by determining the ignition timing according to the torque ratio and the rotational speed of the engine, it possible to always obtain determine the appropriate ignition timing, and hence to obtain the optimum combustion efficiency to thereby ensure sufficient output torque with stability.

Preferably, the engine is provided with a variable compression ratio mechanism that is capable of changing compression ratio of the engine, and the ignition timing control system further comprises compression ratio parameter-detecting means for detecting a compression ratio parameter indicative of the compression ratio, wherein at least one of the maximum torque parameter and the output torque parameter is calculated according to the detected compression ratio parameter.

With the configuration of the preferred embodiment, when the output torque and the maximum torque change as the compression ratio changes, it is possible to determine the ignition timing according to the actual compression ratio.

To attain the above object, in a second aspect of the present invention, there is provided a method of controlling ignition timing of an internal combustion engine, comprising the steps of detecting rotational speed of the engine, calculating a maximum torque parameter indicative of maximum torque that the engine can output when the engine is at the detected rotational speed, according to the detected rotational speed, calculating an output torque parameter indicative of output torque being output from the engine, calculating a torque ratio as a ratio of one of the calculated maximum torque parameter and the output torque parameter to the other, and determining the ignition timing according to the rotational speed of the engine and the calculated torque ratio.

With the configuration of the second aspect of the present invention, it is possible to obtain the same advantageous effects as provided by the first aspect of the present invention.

Preferably, the engine is provided with a variable valve actuating mechanism that is capable of changing at least one of a maximum valve lift of an intake valve, opening timing of the intake valve, and closing timing of the intake valve, and the method further comprises the step of detecting an operating state parameter indicative of an operating state of the variable valve actuating mechanism, wherein at least one of the maximum torque parameter and the output torque parameter is calculated according to the detected operating state parameter.

Preferably, the engine is provided with a variable compression ratio mechanism that is capable of changing compression ratio of the engine, and the method further comprises the step of detecting a compression ratio parameter indicative of the compression ratio, wherein at least one of the maximum torque parameter and the output torque parameter is calculated according to the detected compression ratio parameter.

With the configurations of these preferred embodiments, it is possible to obtain the same advantageous effects as provided by the corresponding preferred embodiments of the first aspect of the present invention.

To attain the above object, in a third aspect of the present invention, there is provided an engine control unit including a control program for causing a computer to control ignition timing of an internal combustion engine, wherein the control program causes the computer to detect rotational speed of the engine, calculate a maximum torque parameter indicative of maximum torque that the engine can output when the engine is at the detected rotational speed, according to the detected rotational speed, calculate an output torque parameter indicative of output torque being output from the engine, calculate a torque ratio as a ratio of one of the calculated maximum torque parameter and the output torque parameter to the other, and determine the ignition timing according to the rotational speed of the engine and the calculated torque ratio.

With the configuration of the third aspect of the present invention, it is possible to obtain the same advantageous effects as provided by the first aspect of the present invention.

Preferably, the engine is provided with a variable valve actuating mechanism that is capable of changing at least one of a maximum valve lift of an intake valve, opening timing of the intake valve, and closing timing of the intake valve, and the control program causes the computer to detect an operating state parameter indicative of an operating state of the variable valve actuating mechanism, wherein at least one of the maximum torque parameter and the output torque parameter is calculated according to the detected operating state parameter.

Preferably, the engine is provided with a variable compression ratio mechanism that is capable of changing compression ratio of the engine, and the control program causes the computer to detect a compression ratio parameter indicative of the compression ratio, wherein at least one of the maximum torque parameter and the output torque parameter is calculated according to the detected compression ratio parameter.

With the configurations of these preferred embodiments, it is possible to obtain the same advantageous effects as provided by the corresponding preferred embodiments of the first aspect of the present invention.

The above and other objects, features, and advantages of the present invention will become more apparent from the following detailed description taken in conjunction with the accompanying drawings.

BRIEF DESCRIPTION OF THE DRAWINGS

FIG. 6A is a diagram showing an intake valve placed in an open state when a lower link of the variable valve lift mechanism is in the maximum lift position;

FIG. 6B is a diagram showing the intake valve placed in an open state when the lower link of the variable valve lift mechanism is in the minimum lift position;

DETAILED DESCRIPTION OF PREFERRED EMBODIMENTS

Figure 1:
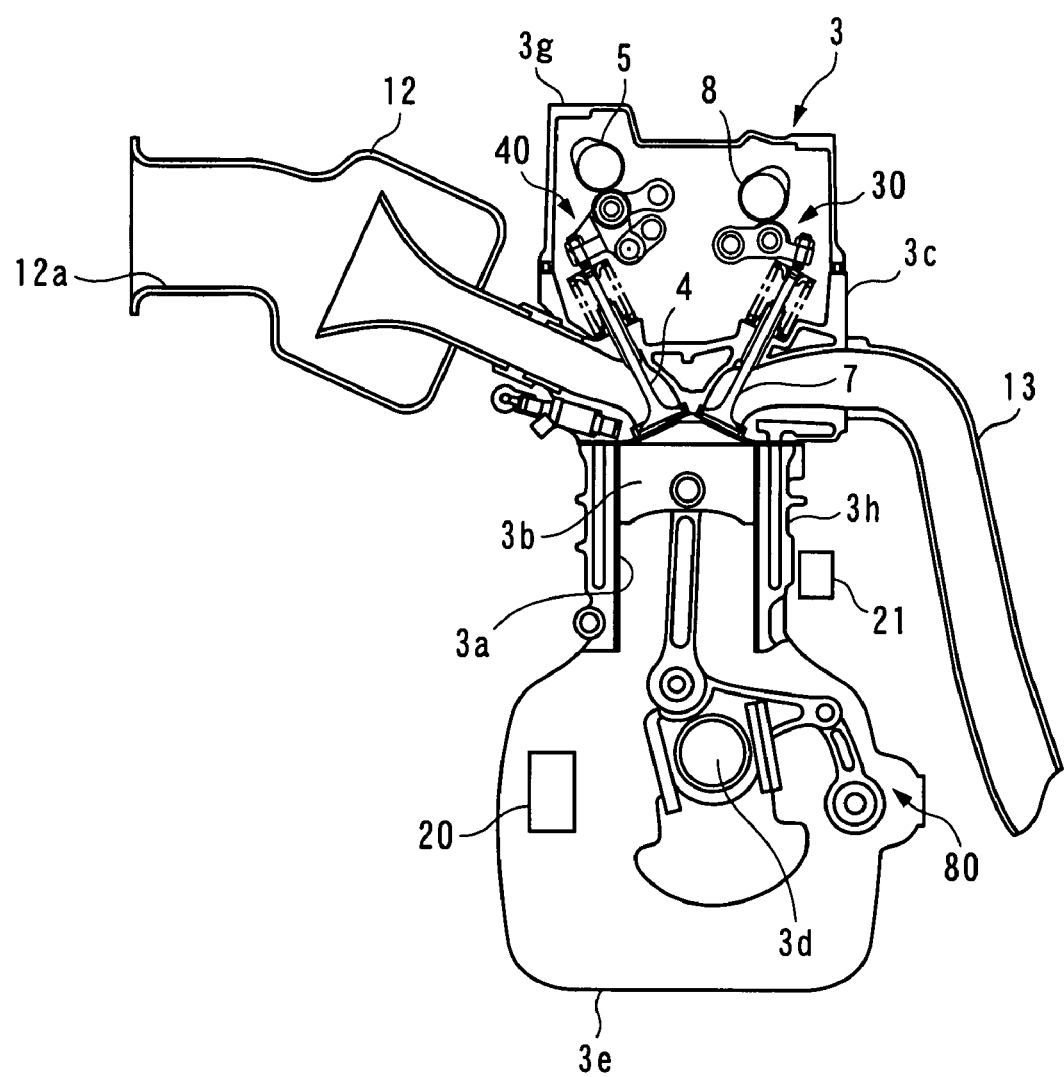
FIG. 1 is a schematic diagram of an internal combustion engine to which is applied an ignition timing control system according to an embodiment of the present invention.
Figure 3:
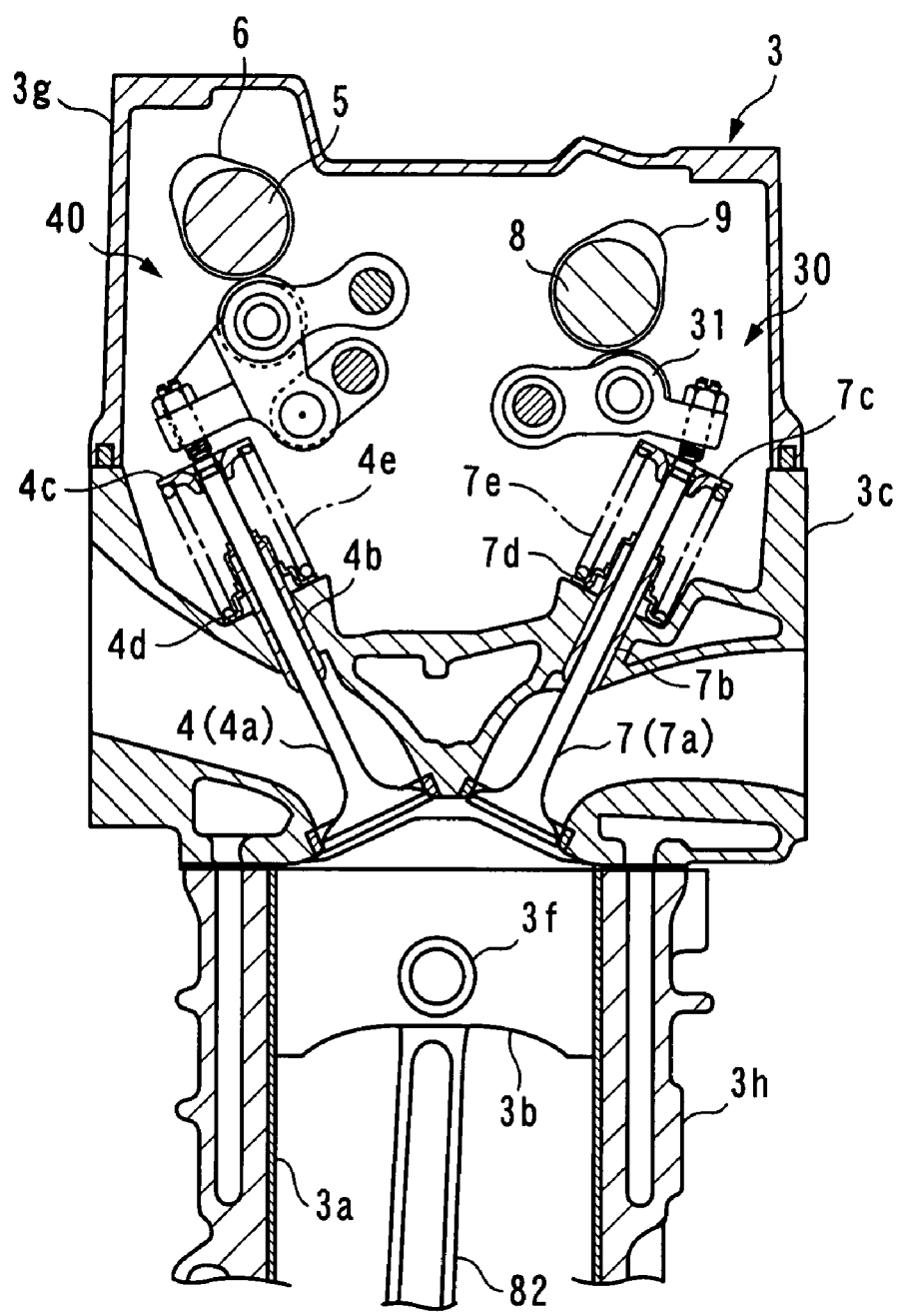
FIG. 3 is a schematic cross-sectional view of a variable intake valve-actuating mechanism and an exhaust valve-actuating mechanism.

Hereafter, an ignition timing control system for an internal combustion engine, according to a preferred embodiment of the present invention, will be described with reference to the drawings. FIGS. 1 and 3 show an internal combustion engine (hereinafter simply referred to as "the engine") to which is applied the ignition timing control system 1 according to the present embodiment.

The engine 3 is an in-line four-cylinder gasoline engine having a four pairs of cylinders 3a and pistons 3b (only one pair of which is shown), and installed on a vehicle, not shown. The engine 3 includes an intake valve 4 and an exhaust valve 7 provided for each cylinder 3a, for opening and closing an intake port and an exhaust port thereof, respectively, a variable intake valve-actuating mechanism 40 (variable valve-actuating mechanism) for actuating the intake valves 4, which includes an intake camshaft 5 and intake cams 6, an exhaust valve-actuating mechanism 30 for actuating the exhaust valves 7, which includes an exhaust camshaft 8 and exhaust cams 9, a variable compression ratio mechanism 80 for varying a compression ratio Cr, and spark plugs 10 (see FIG. 2).

Figure 4:
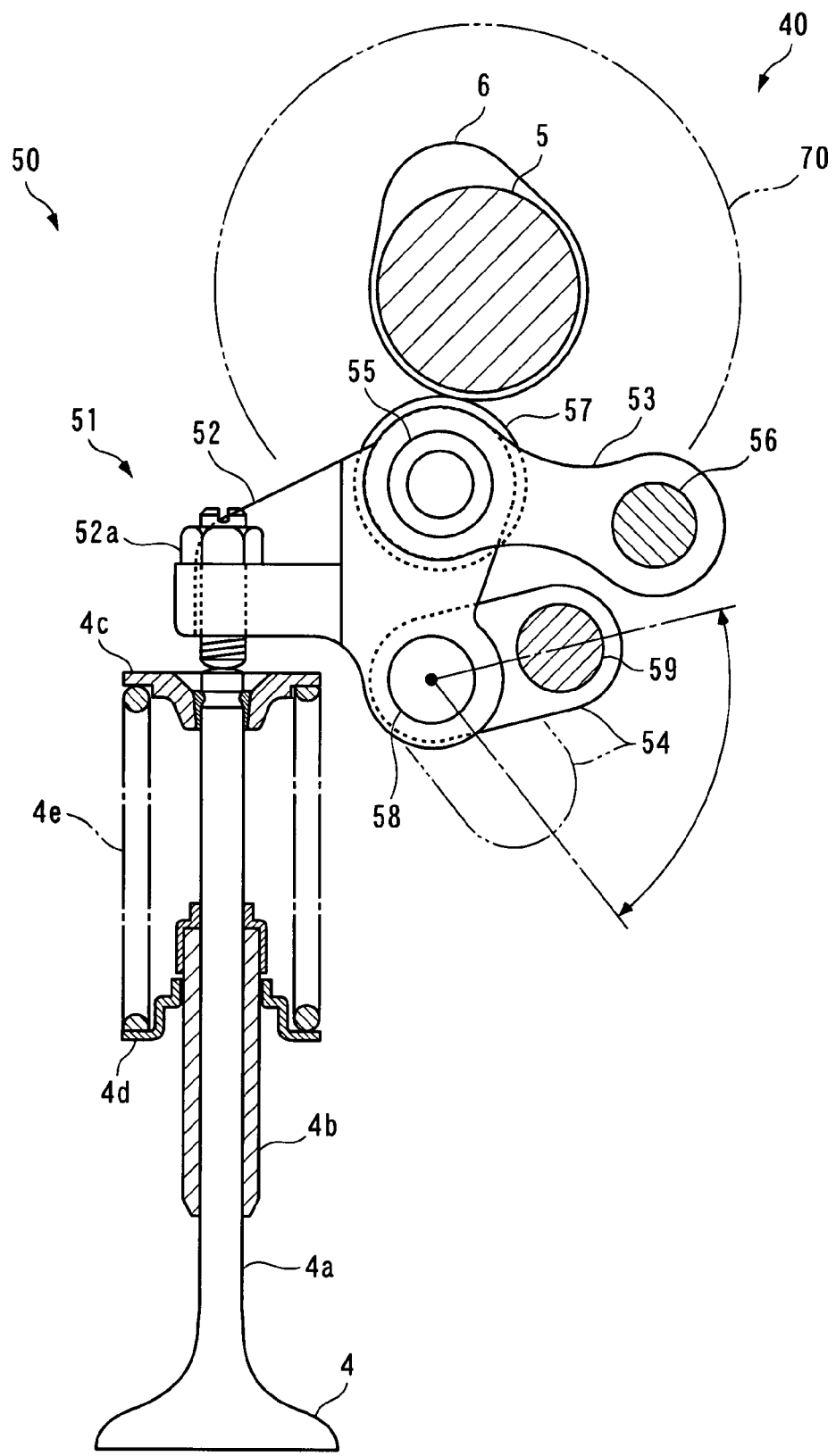
FIG. 4 is a schematic cross-sectional view of a variable valve lift mechanism of the variable intake valve-actuating mechanism.

The intake valve 4 has a stem 4a thereof slidably fitted in a guide 4b. The guide 4b is rigidly fixed to a cylinder head 3c. As shown in FIG. 4, the intake valve 4 includes upper and lower spring sheets 4c and 4d, and a valve spring 4e disposed therebetween, and is urged by the valve spring 4e in the valve-closing direction.

The intake camshaft 5 and the exhaust camshaft 8 are rotatably mounted through the cylinder head 3c via holders (not shown). The intake camshaft 5 has an intake sprocket (not shown) coaxially and rotatably fitted on one end thereof. The intake sprocket is connected to a crankshaft 3d via a timing chain (not shown), and is connected to the intake camshaft 5 via a variable cam phase mechanism 70, described hereinafter. With the above arrangement, the intake camshaft 5 performs one rotation per two rotations of the crankshaft 3d. Further, the intake cams 6 are integrally formed with the intake camshaft 5, on a cylinder-by-cylinder basis.

The variable intake valve-actuating mechanism 40 is provided for actuating the intake valve 4 of each cylinder 3a so as to open and close the same, in accordance with rotation of the intake camshaft 5, and continuously changing the lift and the valve timing of the intake valve 4, which will be described in detail hereinafter. In the present embodiment, the maximum lift Liftin corresponds to an operating state parameter.

On the other hand, the exhaust valve 7 has a stem 7a thereof slidably fitted in a guide 7b. The guide 7b is rigidly fixed to the cylinder head 3c. Further, the exhaust valve 7 includes upper and lower spring sheets 7c and 7d, and a valve spring 7e disposed therebetween, and is urged by the valve spring 7e in the valve-closing direction.

The exhaust camshaft 8 has an exhaust sprocket (not shown) integrally formed therewith, and is connected to the crankshaft 3d by the exhaust sprocket and the timing chain, not shown, whereby the exhaust camshaft 8 performs one rotation per two rotations of the crankshaft 3d. Further, the exhaust cams 9 are integrally formed with the exhaust camshaft 8, on a cylinder-by-cylinder basis.

The exhaust valve-actuating mechanism 30 includes rocker arms 31. Each rocker arm 31 is pivotally moved in accordance with rotation of the associated exhaust cam 9 to thereby actuate the exhaust valve 7 for opening and closing the same against the urging force of the valve spring 7e.

The spark plug 10 as well is provided for each cylinder 3a, and mounted through the cylinder head 3c. The spark plug 10 has high voltage applied thereto by a drive signal from an ECU 2, referred to hereinafter, in timing corresponding to ignition timing Iglog, and then undergoes electric discharge by interruption, which causes ignition of a mixture in each cylinder 3a.

On the other hand, the engine 3 is provided with a crank angle sensor 20 (rotational speed-detecting means) and an engine coolant temperature sensor 21. The crank angle sensor 20 is comprised of a magnet rotor and an MRE (magnetic resistance element) pickup, and delivers a CRK signal, which is a pulse signal, to the ECU 2 in accordance with rotation of the crankshaft 3d. Each pulse of the CRK signal is generated whenever the crankshaft 3d rotates through a predetermined angle (e.g. 10°). The ECU 2 calculates the rotational speed NE of the engine 3 (hereinafter referred to as "the engine speed NE") based on the CRK signal. Further, the TDC signal indicates that the piston 3b of each cylinder 3a is at a predetermined crank angle position slightly before a TDC (top dead center) position from which the intake stroke starts, and is delivered whenever the crankshaft rotates through predetermined degrees.

The engine coolant temperature sensor 21 is implemented e.g. by a thermistor, and detects an engine coolant temperature TW to deliver a signal indicative of the sensed engine coolant temperature TW to the ECU 2. The engine coolant temperature TW is the temperature of an engine coolant circulating through a cylinder block 3h of the engine 3.

Further, the engine 3 has an intake pipe 12 from which a throttle valve mechanism is omitted, and an intake passage 12a having a large diameter is formed through the intake pipe 12, whereby the engine 3 is configured such that flow resistance is smaller than in an ordinary engine.

Next, a description will be given of the aforementioned variable intake valve-actuating mechanism 40. As shown in FIG. 4, the variable intake valve-actuating mechanism 40 is comprised of the intake camshaft 5, the intake cams 6, a variable valve lift mechanism 50, and the variable cam phase mechanism 70.

The variable valve lift mechanism 50 actuates the intake valves 4 to open and close the same, in accordance with rotation of the intake camshaft 5, and continuously changes the maximum lift Liftin between a predetermined maximum value Liftinmax and a predetermined minimum value Liftinmin. The variable valve lift mechanism 50 is comprised of rocker arm mechanisms 51 of a four joint link type, provided for the respective cylinders 3a, and a lift actuator 60 (see FIGS. 5A and 5B) simultaneously actuating these rocker arm mechanisms 51.

Each rocker arm mechanism 51 is comprised of a rocker arm 52, and upper and lower links 53 and 54. The upper link 53 has one end pivotally mounted to an upper end of the rocker arm 52 by an upper pin 55, and the other end pivotally mounted to a rocker arm shaft 56. The rocker arm shaft 56 is mounted through the cylinder head 3c via holders, not shown.

Further, a roller 57 is pivotally disposed on the upper pin 55 of the rocker arm 52. The roller 57 is in contact with a cam surface of the intake cam 6. As the intake cam 6 rotates, the roller 57 rolls on the intake cam 6 while being guided by the cam surface of the intake cam 6. As a result, the rocker arm 52 is vertically driven, and the upper link 53 is pivotally moved about the rocker arm shaft 56.

Furthermore, an adjusting bolt 52a is mounted to an end of the rocker arm 52 toward the intake valve 4. When the rocker arm 52 is vertically moved in accordance with rotation of the intake cam 6, the adjusting bolt 52a vertically drives the stem 4a to open and close the intake valve 4, against the urging force of the valve spring 4e.

Further, the lower link 54 has one end pivotally mounted to a lower end of the rocker arm 52 by a lower pin 58, and the other end of the lower link 54 has a connection shaft 59 pivotally mounted thereto. The lower link 54 is connected to a short arm 65, described hereinafter, of the lift actuator 60 by the connection shaft 59.

Figure 5A:
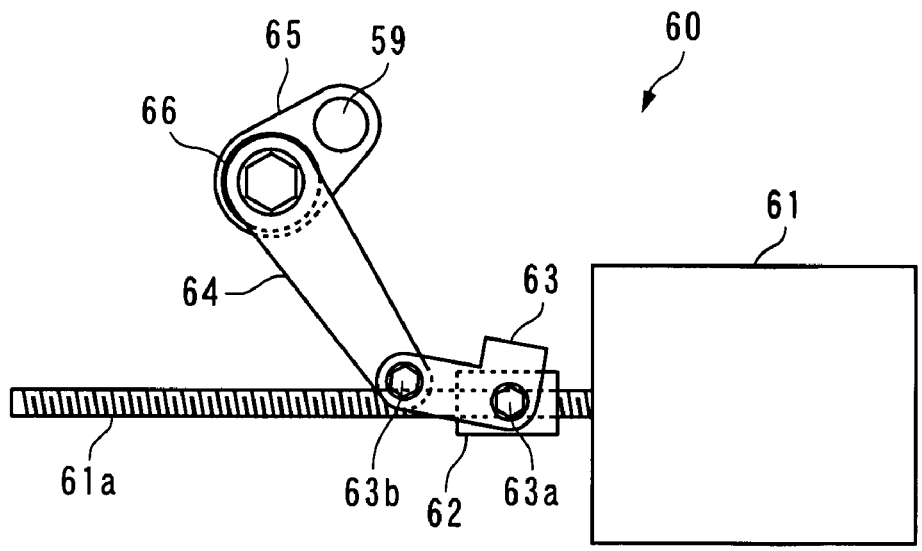
FIG. 5A is a diagram showing a lift actuator in a state in which a short arm thereof is in the maximum lift position.
Figure 5B:
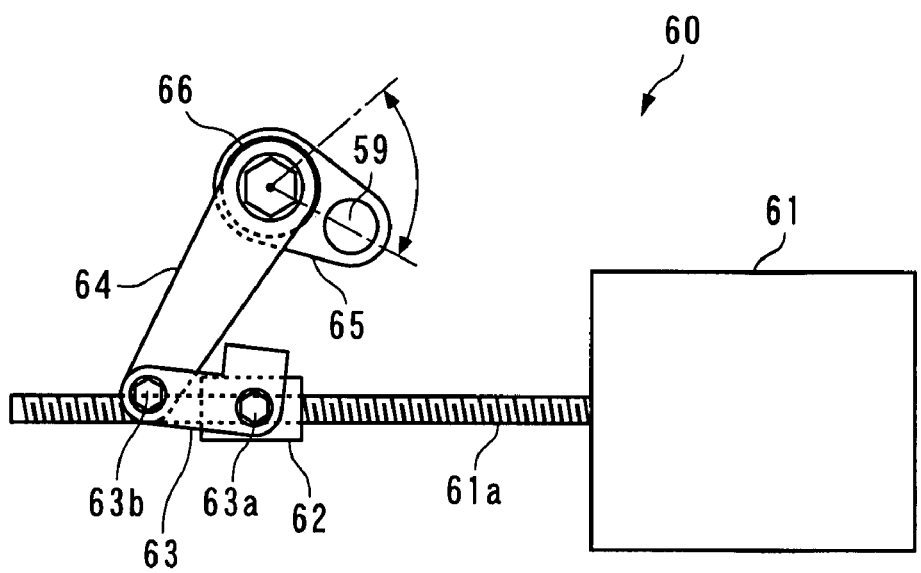
FIG. 5B is a diagram showing the lift actuator in a state in which the short arm thereof is in the minimum lift position.

On the other hand, as shown in FIGS. 5A and 5B, the lift actuator 60 is comprised of a motor 61, a nut 62, a link 63, a long arm 64, and the short arm 65. The motor 61 is connected to the ECU 2, and disposed outside a head cover 3g of the engine 3. The rotating shaft of the motor 61 is a screw shaft 61a formed with a male screw, and the nut 62 is screwed onto the screw shaft 61a. The nut 62 is connected to the long arm 64 by the link 63. The link 63 has one end pivotally mounted to the nut 62 by a pin 63a, and the other end pivotally mounted to one end of the long arm 64 by a pin 63b.

Further, the other end of the long arm 64 is attached to one end of the short arm 65 by a pivot shaft 66. The pivot shaft 66 is circular in cross section, and extends through the head cover 3g of the engine 3 such that it is pivotally supported by the head cover 3g. The long arm 64 and the short arm 65 are pivotally moved in unison with the pivot shaft 66 in accordance with pivotal motion of the pivot shaft 66.

Furthermore, the aforementioned connection shaft 59 rotatably extends through the other end of the short arm 65, whereby the short arm 65 is connected to the lower link 54 by the connection shaft 59.

Next, a description will be given of the operation of the variable valve lift mechanism 50 constructed as above. In the variable valve lift mechanism 50, when a lift control input U_Liftin, described hereinafter, is input from the ECU 2 to the lift actuator 60, the screw shaft 61a rotates, and the nut 62 is moved in accordance with the rotation of the screw shaft 61a, whereby the long arm 64 and the short arm 65 are pivotally moved about the pivot shaft 66, and in accordance with the pivotal motion of the short arm 65, the lower link 54 of the rocker arm mechanism 51 is pivotally moved about the lower pin 58. That is, the lower link 54 is driven by the lift actuator 60.

During the above process, under the control of the ECU 2, the range of pivotal motion of the short arm 65 is restricted between the maximum lift position shown in FIG. 5A and the minimum lift position shown in FIG. 5B, whereby the range of pivotal motion of the lower link 54 is also restricted between the maximum lift position indicated by the solid line in FIG. 4 and the minimum lift position indicated by the two-dot chain line in FIG. 4.

The four joint link formed by the rocker arm shaft 56, the upper and lower pins 55 and 58, and the connection shaft 59 is configured such that when the lower link 54 is in the maximum lift position, the distance between the center of the upper pin 55 and the center of the lower pin 58 becomes longer than the distance between the center of the rocker arm shaft 56 and the center of the connection shaft 59, whereby as shown in FIG. 6A, when the intake cam 6 rotates, the amount of movement of the adjusting bolt 52a becomes larger than the amount of movement of a contact point where the intake cam 6 and the roller 57 are in contact with each other.

On the other hand, the four joint link is configured such that when the lower link 54 is in the minimum lift position, the distance between the center of the upper pin 55 and the center of the lower pin 58 becomes shorter than the distance between the center of the rocker arm shaft 56 and the center of the connection shaft 59, whereby as shown in FIG. 6B, when the intake cam 6 rotates, the amount of movement of the adjusting bolt 52a becomes smaller than the amount of movement of the contact point where the intake cam 6 and the roller 57 are in contact with each other.

For the above reason, when the lower link 54 is in the maximum lift position, the intake valve 4 is opened with a maximum lift Liftin larger than when the lower link 54 is in the minimum lift position. More specifically, during rotation of the intake cam 6, when the lower link 54 is in the maximum lift position, the intake valve 4 is opened according to a lift curve indicated by a solid line in FIG. 7, and the maximum lift Liftin assumes its maximum value Liftinmax. On the other hand, when the lower link 54 is in the minimum lift position, the intake valve 4 is opened according to a lift curve indicated by a two-dot chain line in FIG. 7, and the maximum lift Liftin assumes its minimum value Liftinmin.

Therefore, in the variable valve lift mechanism 50, the lower link 54 is pivotally moved by the lift actuator 60 between the maximum lift position and the minimum lift position, whereby it is possible to steplessly change the maximum lift Liftin between the maximum value Liftinmax and the minimum value Liftinmin.

Figure 7:
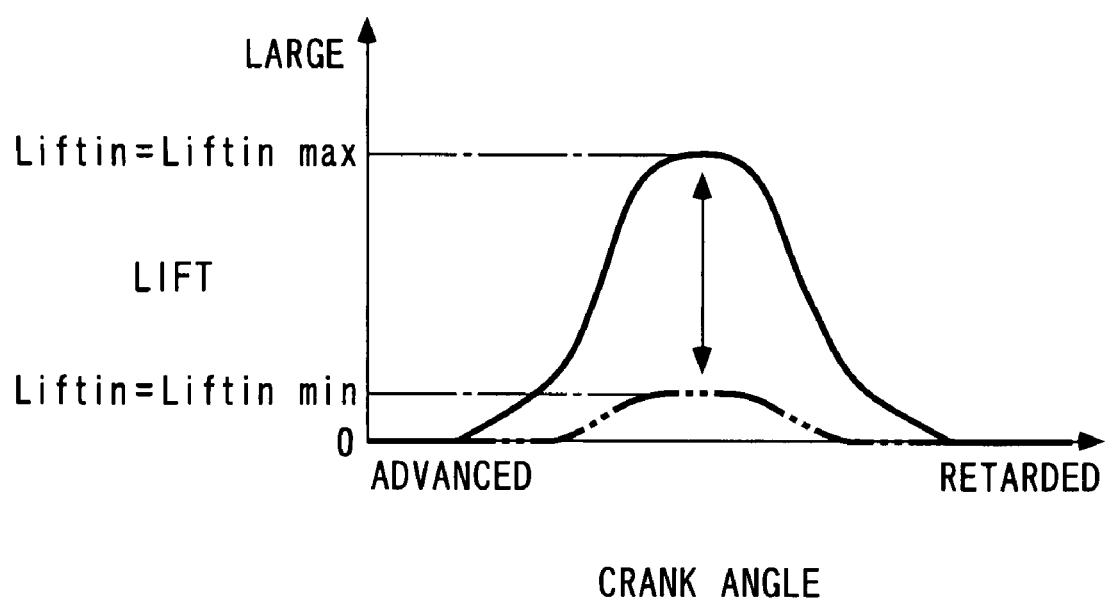
FIG. 7 is a diagram showing a valve lift curve (solid line) obtained when the lower link of the variable valve lift mechanism is in the maximum lift position, and a valve lift curve (two-dot chain line) obtained when the lower link of the variable valve lift mechanism is in the minimum lift position.

It should be noted as shown in FIG. 7, in the variable valve lift mechanism 50, due to the mechanism thereof, as the maximum lift Liftin is larger, the opening timing of the intake valve 4 is more advanced, and the closing timing thereof is more retarded to prolong a time period over which the valve is open.

It should be noted that the variable valve lift mechanism 50 is provided with a lock mechanism, not shown, and the lock mechanism locks the operation of the variable valve lift mechanism 50 when the lift control input U_Liftin is set to a value of a failure-time value U_Liftin_fs, as described hereinafter, and when the lift control input U_Liftin is not input from the ECU 2 to the lift actuator 60 e.g. due to a disconnection. That is, the variable valve lift mechanism 50 is inhibited from changing the maximum lift Liftin, whereby the maximum lift Liftin is held at the minimum value Liftinmin. It should be noted that when a cam phase Cain is held at a predetermined locked value, referred to hereinafter, and at the same time the compression ratio Cr is held at the minimum value Crmin, the minimum value Liftinmin is set to such a value as will ensure a predetermined failure-time value Gcyl_fs, referred to hereinafter, of the intake air amount. The predetermined failure-time value Gcyl_fs is set to a value which is capable of suitably carrying out idling or starting of the engine 3 during stoppage of the vehicle, and is capable of holding the vehicle in a state of low-speed traveling when the vehicle is traveling.

Figure 2:
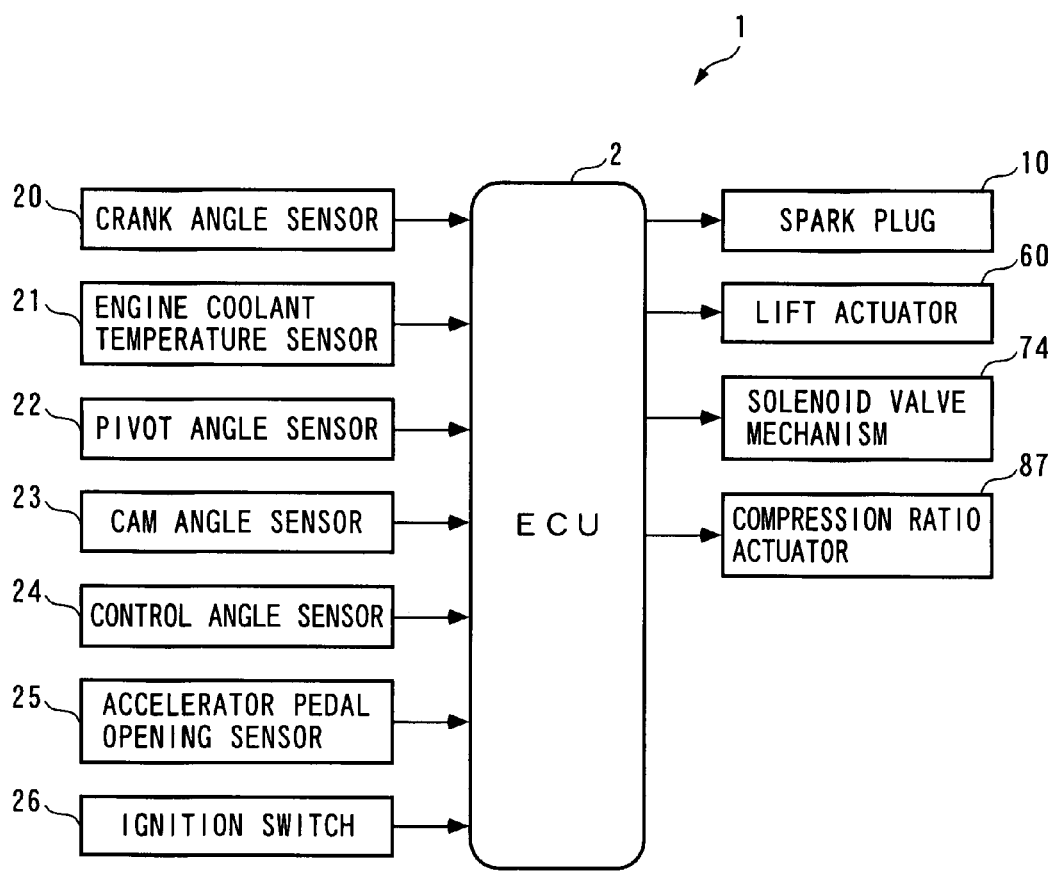
FIG. 2 is a schematic block diagram of the ignition timing control system according to the embodiment.

The engine 3 is provided with a pivot angle sensor 22 (operating state parameter-detecting means) (see FIG. 2). The pivot angle sensor 22 detects a pivot angle of the rotating shaft 66 i.e. the short arm 65, and delivers a signal indicative of the detected pivot angle of the short arm 65 to the ECU 2. The ECU 2 calculates the maximum lift Liftin based on the detection signal from the pivot angle sensor 22.

Figure 8:
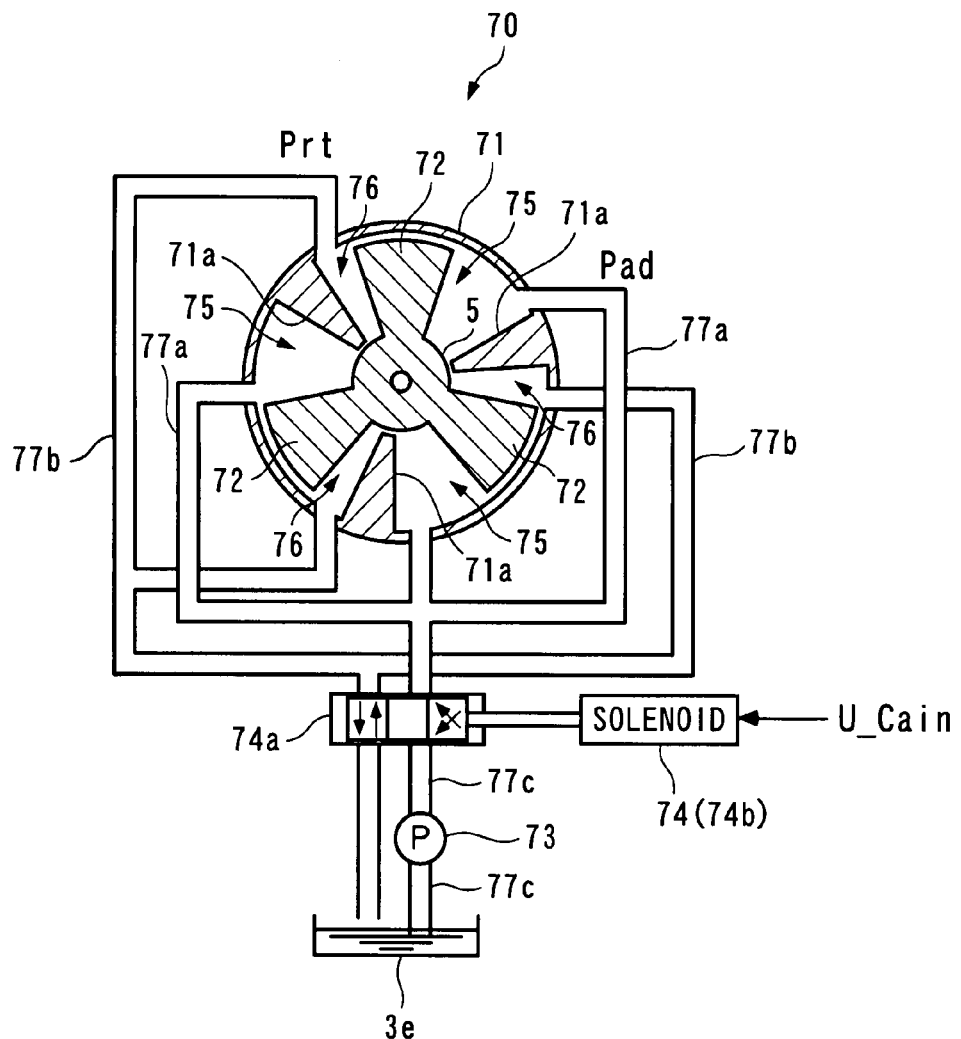
FIG. 8 is a schematic diagram of a variable cam phase mechanism.

Next, a description will be given of the aforementioned variable cam phase mechanism 70. The variable cam phase mechanism 70 is provided for continuously advancing or retarding the relative phase Cain of the intake camshaft 5 with respect to the crankshaft 3d (hereinafter referred to as "the cam phase Cain"), and is mounted on an intake sprocket-side end of the intake camshaft 5. As shown in FIG. 8, the variable cam phase mechanism 70 includes a housing 71, a three-bladed vane 72, an oil pressure pump 73, and a solenoid valve mechanism 74. In the present embodiment, the cam phase Cain corresponds to the operating state parameter.

The housing 71 is integrally formed with the intake sprocket on the intake camshaft 5, and is divided by three partition walls 71a formed at equal intervals. The vane 72 is coaxially mounted on the intake sprocket-side end of the intake camshaft 5, such that the vane 72 radially extends outward from the intake camshaft 5, and rotatably housed in the housing 71. Further, the housing 71 has three advance chambers 75 and three retard chambers 76 each formed between one of the partition walls 71a and one of the three blades of the vane 72.

The oil pressure pump 73 is of a mechanical type which is connected to the crankshaft 3d. As the crankshaft 3d rotates, the oil pressure pump 73 draws lubricating oil stored in an oil pan 3e of the engine 3 via an oil passage 77c, for pressurization, and supplies the pressurized oil to the solenoid valve mechanism 74 via the oil passage 77c.

The solenoid valve mechanism 74 is formed by combining a spool valve mechanism 74a and a solenoid 74b, and is connected to the advance chambers 75 and the retard chambers 76 via an advance oil passage 77a and a retard oil passage 77b such that oil pressure supplied from the oil pressure pump 73 is output to the advance chambers 75 and the retard chambers 76 as advance oil pressure Pad and retard oil pressure Prt, respectively. When a phase control input U_Cain, referred to hereinafter, is input from the ECU 2, the solenoid 74b of the solenoid valve mechanism 74 moves a spool valve element of the spool valve mechanism 74a within a predetermined range of motion according to the phase control input U_Cain to thereby change both the advance oil pressure Pad and the retard oil pressure Prt.

Figure 9:
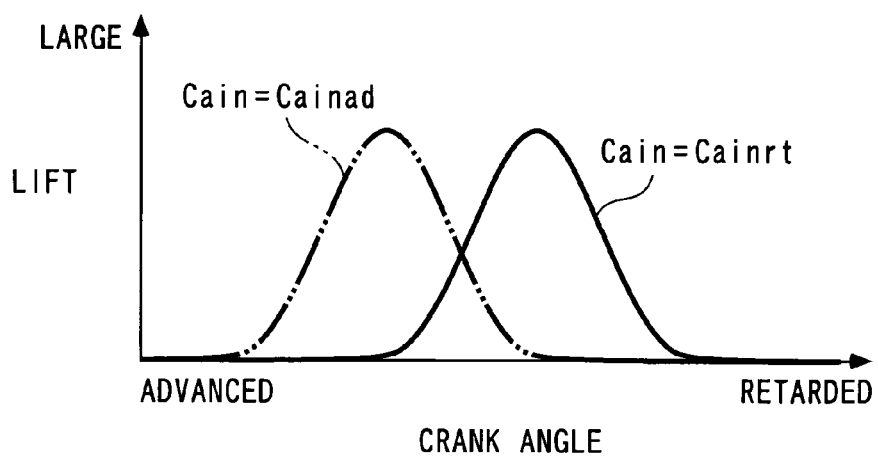
FIG. 9 is a diagram showing a valve lift curve (solid line) obtained when a cam phase is set to a most retarded value by the variable cam phase mechanism, and a valve lift curve (two-dot chain line) obtained when the cam phase is set to a most advanced value by the variable cam phase mechanism.

In the variable cam phase mechanism 70 constructed as above, during operation of the oil pressure pump 73, the solenoid valve mechanism 74 is operated according to the phase control input U_Cain, to supply the advance oil pressure Pad to the advance chambers 75 and the retard oil pressure Prt to the retard chambers 76, whereby the relative phase between the vane 72 and the housing 71 is changed toward an advanced side or a retarded side. As a result, the cam phase Cain described above is continuously changed between a most retarded value Cainrt (e.g. a value corresponding to a cam angle of 0°) and a most advanced value Cainad (e.g. a value corresponding to a cam angle of 55°), whereby the valve timing of the intake valve 4 is continuously or steplessly changed between a most retarded timing indicated by a solid line in FIG. 9 and a most advanced timing indicated by a two-dot chain line in FIG. 9.

It should be noted that the variable cam phase mechanism 70 is provided with a lock mechanism, not shown, which locks operation of the variable cam phase mechanism 70 when oil pressure supplied from the oil pressure pump 73 is low, when the phase control input U_Cain is set to a value of a failure-time value U_Cain_fs, as described hereinafter, or when the phase control input U_Cain is not input to the solenoid valve mechanism 74 e.g. due to a disconnection. That is, the variable cam phase mechanism 70 is inhibited from changing the cam phase Cain, whereby the cam phase Cain is held at the predetermined locked value. When the maximum lift Liftin is held at the minimum value Liftinmin and at the same time the compression ratio Cr is held at the minimum value Crmin, as described above, the predetermined failure time value Gcyl_fs is secured as the intake air amount, as described hereinabove.

As described above, in the variable intake valve-actuating mechanism 40, the variable valve lift mechanism 50 steplessly varies the maximum lift Liftin, and the variable cam phase mechanism 70 steplessly varies the cam phase Cain, i.e. the valve timing of the intake valve 4, between the aforementioned most retarded timing and the most advanced timing.

On the other hand, a cam angle sensor 23 (operating state parameter-detecting means) (see FIG. 2) is disposed at an end of the intake camshaft 5 opposite from the variable cam phase mechanism 70. The cam angle sensor 23 is implemented e.g. by a magnet rotor and an MRE pickup, for delivering a CAM signal, which is a pulse signal, to the ECU 2 along with rotation of the intake camshaft 5. Each pulse of the CAM signal is generated whenever the intake camshaft 5 rotates through a predetermined cam angle (e.g. 1°). The ECU 2 calculates the cam phase Cain based on the CAM signal and the CRK signal, described above.

Next the aforementioned variable compression ratio mechanism 80 will be described with reference to FIGS. 10A and 10B. The variable compression ratio mechanism 80 is provided for changing the top dead center position of each piston 3b, that is, the stroke of the piston 3b, to thereby continuously change the compression ratio Cr between a predetermined maximum value Crmax and a predetermined minimum value Crmin, and is comprised of a composite link mechanism 81 connected between the piston 3b and the crankshaft 3d, a control shaft 85 for controlling the motion of the composite link mechanism 81, and a compression ratio actuator 87 for actuating the control shaft 85. In the present embodiment, the compression ratio Cr corresponds to a compression ratio parameter.

The composite link mechanism 81 is implemented by an upper link 82, a lower link 83, and a control link 84. The upper link 82 corresponds to a so-called connecting rod, and has an upper end thereof pivotally connected to the piston 3b via a piston pin 3f, and a lower end thereof pivotally connected to an end of the lower link 83 via a pin 83a.

The lower link 83 has a triangular shape. Two ends of the lower link 83 except for the end connected to the upper link 82 are pivotally connected to the crankshaft 3d via a crank pin 83b, and to an end of the control link 84 via a control pin 83c, respectively. With the above configuration, reciprocating motion of the piston 3b is transmitted to the crankshaft 3d via the composite link mechanism 81 such that it is converted into rotating motion of the crankshaft 3d.

Further, the control shaft 85 extends, similarly to the crankshaft 3d, in the direction of depth of the drawing, and includes a rotating shaft part 85a rotatably supported in the cylinder block 3h, and an eccentric shaft part 85b and an arm 86 which are integrally formed with the rotating shaft part 85a. The eccentric shaft part 85b has an lower end of the control link 84 pivotally connected thereto. Further, an end of the arm 86 is a forked part 86a which has an end of the drive shaft 87b of the compression ratio actuator 87 rotatably connected thereto.

Further, the compression ratio actuator 87 is a combination of a motor and a reduction mechanism (neither of which is shown), and includes a casing 87a that contains the motor and the reduction mechanism, and a drive shaft 87b which can be moved in directions for protruding out of the casing 87a and retracting into the same. In the compression ratio actuator 87, when the motor is driven for a normal or reverse rotation by a compression ratio control input U_Cr, referred to hereinafter, from the ECU 2, the drive shaft 87b moves between a low compression ratio position (indicated in FIG. 10A) in which the drive shaft 87b is most protruded out of the casing 87a and a high compression ratio position (indicated in FIG. 10B) in which the same is most retracted into the casing 87a.

Figure 10A:
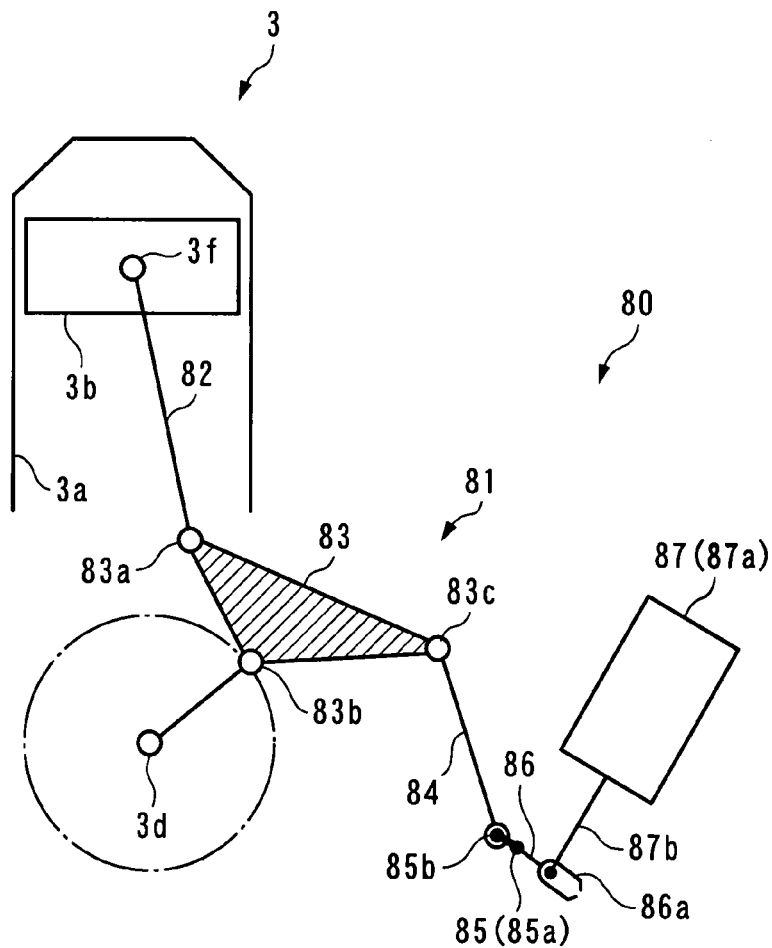
FIG. 10A is a schematic diagram of a variable compression ratio mechanism and associated component parts in a state where the compression ratio is set to a low compression ratio.
Figure 10B:
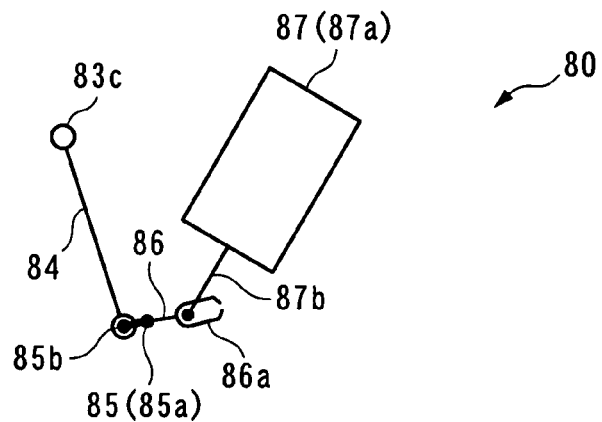
FIG. 10B is a schematic diagram of a variable compression ratio mechanism and associated component parts in a state where the compression ratio is set to a high compression ratio.

With the above configuration, in the variable compression ratio mechanism 80, when the drive shaft 87b of the actuator 87 moves from the low compression ratio position toward the high compression ratio, the control shaft 85 is driven such that it is pivotally moved counterclockwise as viewed in FIG. 10A, via the arm 86 about the rotating shaft part 85a, which causes the eccentric shaft part 85b to move downward. As the whole control link 84 is pushed downward by the downward movement of the arm 85b, the lower link 83 is pivotally moved clockwise as viewed in FIG. 10A about the crank pin 83b, while the upper link 82 is pivotally moved counterclockwise as viewed in FIG. 10A about the piston pin 3f.

On the other hand, inversely to the above, when the drive shaft 87b of the actuator 87 is moved from the high compression ratio position to the low compression ratio position, the rotating shaft part 85a is rotated clockwise as viewed in FIG. 10A, which causes the eccentric shaft part 85b to move upward, whereby the whole control link 84 is pushed upward. This causes, quite inversely to the above operations, the lower link 83 to be pivotally moved counterclockwise, and the upper link 82 to be pivotally moved clockwise, as viewed in FIG. 10A.

From the above, as the drive shaft 87b is closer to the high compression ratio position, the piston 3f, the upper pin 83a, and the crank pin 83b are arranged to be closer to a straight line, whereby the linear distance between the piston pin 3f and the crank pin 83b assumed when the piston 3b reaches the top dead center position becomes longer, which reduces the volume of the combustion chamber to increase the compression ratio Cr. Further, since the bottom dead center position of the piston 3b is shifted toward the top dead center position thereof, whereby the stroke of the piston is reduced to reduce the displacement of the engine 3.

As described above, in the variable compression ratio mechanism 80, by changing the rotational angle of the control shaft 85, the compression ratio Cr is steplessly changed between the aforementioned predetermined maximum value Crmax and the minimum valve Crmin.

It should be noted that the variable compression ratio mechanism 80 includes a lock mechanism, not shown, and when the compression ratio control input U_cr is set to a failure time value U_cr_fs, referred to hereinafter, or when the compression ratio control input U_cr is not inputted to the compression ratio actuator 87 e.g. due to a disconnection, the operation of the variable compression ratio mechanism 80 is locked by the lock mechanism. More specifically, the variable compression ratio mechanism 80 is inhibited from changing the compression ratio Cr, whereby the compression ratio Cr is held at the minimum value Crmin. As described hereinabove, the minimum value Crmin is set to a value which is capable of ensuring the predetermined failure time value Gcyl_fs of the intake air amount when the maximum lift Liftin is held at the minimum value Liftinmin, and at the same time the cam phase Cain is held at the predetermined locked value.

Further, in the engine 3, in the vicinity of the control shaft 85, there is provided a control angle sensor 24 (compression ratio parameter-detecting means) (see FIG. 2). The control angle sensor 24 detects a pivot angle of the rotating shaft 85, and delivers a signal indicative of the sensed control angle to the ECU 2. The ECU 2 calculates the compression ratio Cr based on the signal output from the control angle sensor 24.

Furthermore, as shown in FIG. 2, connected to the ECU 2 are an accelerator pedal opening sensor 25, and an ignition switch (hereinafter referred to as "the IG·SW") 26. The accelerator pedal opening sensor 25 detects a stepped-on amount AP of an accelerator pedal (not shown) of the vehicle (hereinafter referred to as "the accelerator pedal opening AP") and delivers a signal indicative of the sensed accelerator pedal opening AP to the ECU 2. Further, the IG·SW 26 is turned on or off by the operation of an ignition key, not shown, and delivers a signal indicative of the ON/OFF state thereof to the ECU 2.

The ECU 2 is implemented by a microcomputer including a CPU, a RAM, a ROM, and an I/O interface (none of which are shown). The ECU 2 determines operating conditions of the engine 3, based on the detection signals delivered from the above-mentioned sensors 20 to 25, the ON/OFF signal from the IG·SW 26, and the like, and executes control processes according to the determined operation condition of the engine.

More specifically, the ECU 2 controls the maximum lift Liftin, the cam phase Cain, and the compression ratio Cr via the variable valve lift mechanism 50, the variable cam phase mechanism 70 and the variable compression ratio mechanism 80, respectively. In the following description, the variable valve lift mechanism 50, the variable cam phase mechanism 70, the variable compression ratio mechanism 80 will be collectively referred to as "the three variable mechanisms". Further, the ECU 2 carries out ignition timing control process for controlling the ignition timing Iglog. It should be noted that in the present embodiment, the ECU 2 corresponds to the rotational speed-detecting means, maximum torque parameter-calculating means, output torque parameter-calculating means, torque ratio-calculating means, ignition timing-determining means, operating state parameter-detecting means, and compression ratio parameter-detecting means of the present invention.

Figure 11:
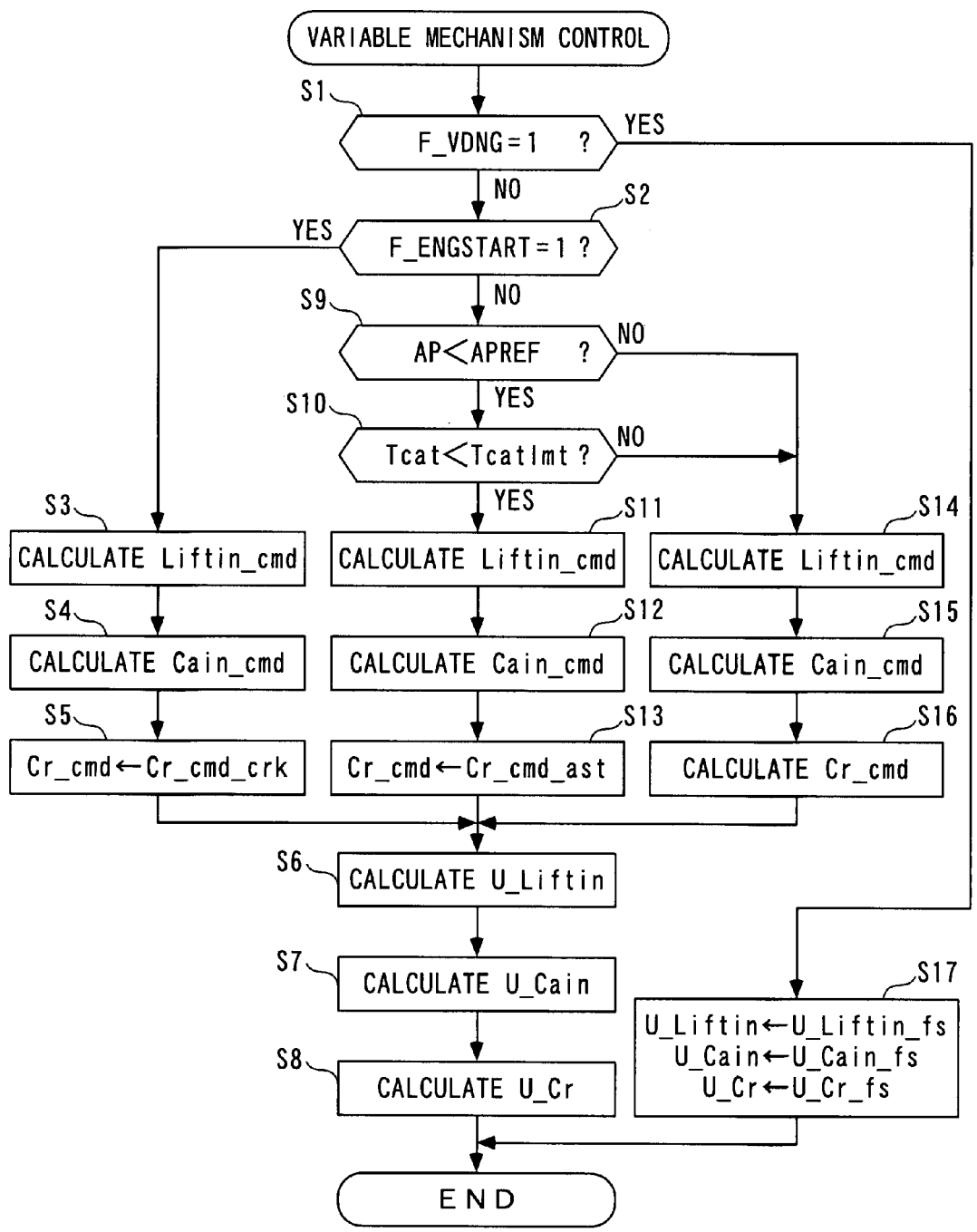
FIG. 11 is a flow diagram of a variable mechanism control process.

FIG. 11 shows a variable mechanism control process for controlling the maximum lift Liftin, the cam phase Cain, and the compression ratio Cr. The present process is executed whenever a predetermined time period (e.g. 5 msec) elapses. First, in a step 1 ((shown as S1 in abbreviated form in FIG. 11; the following steps are also shown in abbreviated form), it is determined whether or not a variable mechanism failure flag F_VDNG is equal to 1. The variable mechanism failure flag F_VDNG is set to 1 when it is determined in a failure determination flag (not shown) that at least one of the three variable mechanisms is faulty.

If the answer to this question is negative (NO), i.e. if all the three variable mechanisms are normal, an engine start flag F_ENGSTART is equal to 1 (step 2). The above engine start flag F_ENGSTART is set by determining in a determination process (not shown), whether or not engine starting control, i.e. cranking is being executed, based on the engine speed NE and the detection signal output from the IG·SW 26. More specifically, when the engine starting control is being executed, the engine start flag F_ENGSTART is set to 1.

Figure 12:
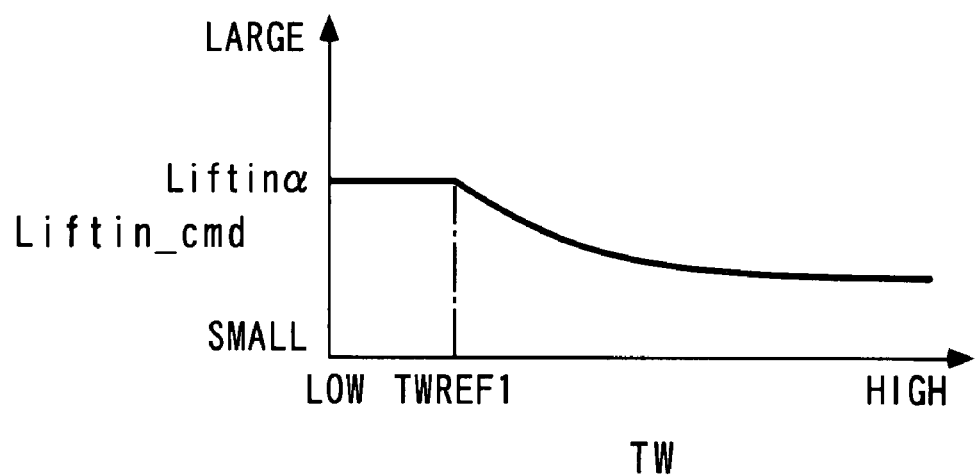
FIG. 12 is a diagram showing an example of a table for use in calculating a target maximum lift Liftin_cmd during starting of the engine.

If the answer to the question of the step 2 is affirmative (YES), i.e. if the engine starting control is being executed, the target maximum lift Liftin_cmd is calculated by searching a table shown in FIG. 12 according to the engine coolant temperature TW (step 3). In this table, in the range where the engine coolant temperature TW is higher than a predetermined value TWREF1, the target maximum lift Liftin_cmd is set to a larger value as the engine coolant temperature TW is lower, and in the range where TW≦TWREF1 holds, the target maximum lift Liftin_cmd is set to a predetermined value Liftin α. This is to compensate for an increase in friction of the variable valve lift mechanism 50, which is caused when the engine coolant temperature TW is low.

Figure 13:
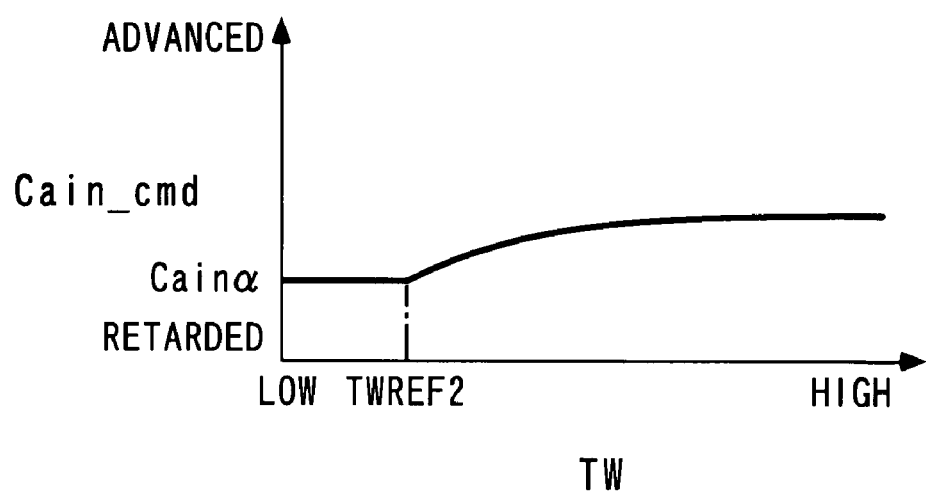
FIG. 13 is a diagram showing an example of a table for use in calculating a target cam phase Cain_cmd during starting of the engine.

Then, the target cam phase Cain_cmd is calculated by searching a table shown in FIG. 13 according to the engine coolant temperature TW (step 4). In this table, in the range where the engine coolant temperature TW is higher than a predetermined value TWREF2, the target cam phase Cain_cmd is set to a more retarded value as the engine coolant temperature TW is lower, and in the range where TW≦TWREF2 holds, the target cam phase Cain_cmd is set to a predetermined value Cain α. This is to ensure the combustion stability of the engine 3 by controlling the cam phase Cain to a more retarded value when the engine coolant temperature TW is low than when the engine coolant temperature TW is high, to thereby reduce the valve overlap of the intake valve 4 and the exhaust valve 7, to increase the flow velocity of intake air.

Then, the target compression ratio Cr_cmd is set to a predetermined start-time value Cr_cmd_crk (step 5). The start-time value Cr_cmd_crk is set to a value on a low compression ratio side, which is capable of increasing the engine speed NE during execution of cranking of the engine 3 to suppress generation of unburned HC.

Next, the lift control input U_Liftin is calculated with a predetermined feedback control algorithm such that the maximum lift Liftin becomes equal to a target maximum lift Liftin_cmd (step 6). Next, the phase control input U_Cain is calculated with a predetermined feedback control algorithm such that the cam phase Cain becomes equal to a target cam phase Cain_cmd (step 7). Next, the compression ratio control input U_Cr is calculated with a predetermined feedback control algorithm such that the compression ratio Cr becomes equal to a target compression ratio Cr_cmd (step 8), followed by terminating the present process.

On the other hand, if the answer to the question of the step 2 is negative (NO), i.e. if the engine starting control is not being executed, it is determined whether or not the accelerator pedal opening AP is smaller than a predetermined value APREF (step 9). The predetermined value APREF is for determining that the accelerator pedal is not stepped on, and set to a value (e.g. 1°) which makes it possible to determine that the accelerator pedal is not stepped on.

If the answer to the question is affirmative (YES), i.e. if the accelerator pedal is not stepped on, it is determined whether or not the timer count value Tcat of a catalyst warmup timer is smaller than a predetermined value Tcatlmt (step 10). The catalyst warmup timer is for measuring a time period over which the catalyst warmup control has been executed, and is formed by an upcount timer. It should be noted that the catalyst warmup control is executed for activating an emission-reducing catalyst in the catalytic converter (not shown) arranged in the exhaust pipe 13.

Figure 14:
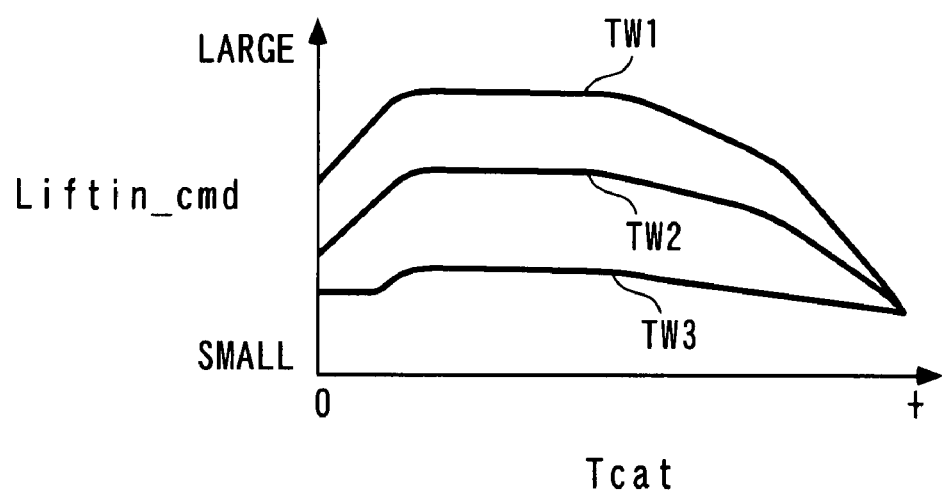
FIG. 14 is a diagram showing an example of a map for use in calculating a target maximum lift Liftin_cmd during catalyst warmup control.

If the answer to this question of the step 10 is affirmative (YES), i.e. if Tcat<Tcatlmt holds, in other words, during execution of catalyst warmup control, the target maximum lift Liftin_cmd is calculated by searching a map shown in FIG. 14 according to the timer value Tcat of the catalyst warmup timer and the engine coolant temperature TW (step 11). In FIG. 14, TW1 to TW3 indicate predetermined values of the engine coolant temperature TW (TW1<TW2<TW3).

In this map, the target maximum lift Liftin_cmd is set to a larger value as the engine coolant temperature TW is lower. This is because as the engine coolant temperature TW is lower, it takes a longer time period to activate the catalyst, and hence the volume of exhaust gasses is increased to shorten the time period required for activating the catalyst. Furthermore, in the above map, in a region where the timer value Tcat of the catalyst warmup timer is small, the target maximum lift Liftin_cmd is set to a larger value as the time value Tcat is larger, whereas in a region where the execution time period Tcat of the catalyst warmup timer is large, the target maximum lift Liftin_cmd is set to a smaller value as the time value Tcat is larger. This is because the warming up of the engine 3 proceeds along with the lapse of time during which the catalyst warmup control is executed, so that when the friction lowers, unless the intake air amount is decreased, the ignition timing is excessively retarded so as to hold the engine speed NE at a target value, which makes unstable the combustion state of the engine. To avoid the combustion state from being unstable, the map is configured as described above.

Figure 15:
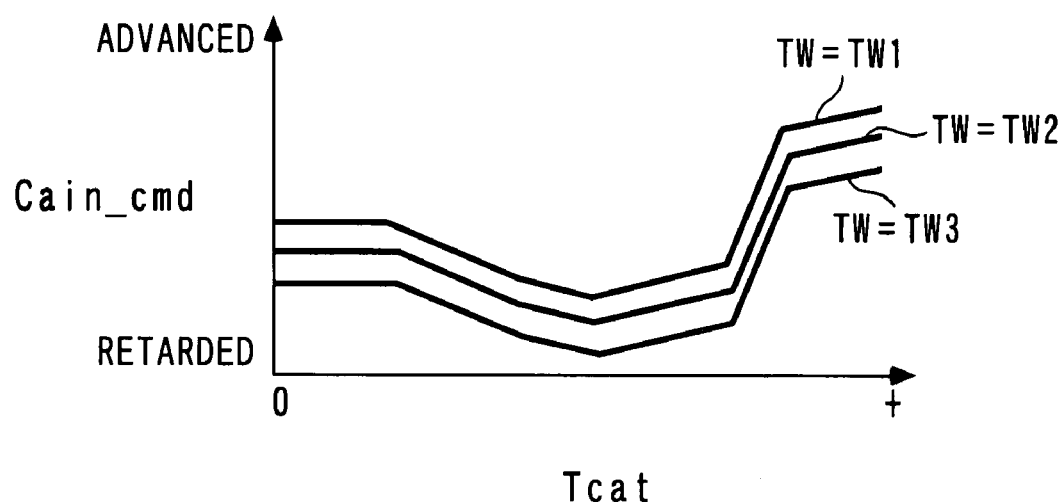
FIG. 15 is a diagram showing an example of a map for use in calculating a target cam phase Cain_cmd during catalyst warmup control.

Then, the target cam phase Cain_cmd is calculated by searching a map shown in FIG. 15 according to the timer value Tcat of the catalyst warmup timer and the engine coolant temperature TW (step 12).

In this map, the target cam phase Cain_cmd is set to a more advanced value as the engine coolant temperature TW is lower. This is because as the engine coolant temperature TW is lower, it takes a longer time period to activate the catalyst, as described above, and hence to shorten the time period required for activating the catalyst, by increasing the intake air amount. Furthermore, in the above map, in a region where the timer value Tcat of the catalyst warmup timer is small, the target cam phase Cain_cmd is set to a more retarded value as the timer value Tcat is larger, whereas in a region where the timer value Tcat is large, the target cam phase Cain_cmd is set to a more advanced value as the timer value Tcat is larger. The reason for this is the same as given in the description of the FIG. 14 map.

Next, the target compression ratio Cr_cmd is set to a predetermined warm-up control value Cr_cmd_ast (step 13), and then the step 6 et seq. are executed. The warm up control value Cr_cmd_ast is set to a value for a lower compression ratio to lower thermal efficiency, and raise exhaust gas temperature so as to reduce time required for activation of the catalyst.

Figure 16:
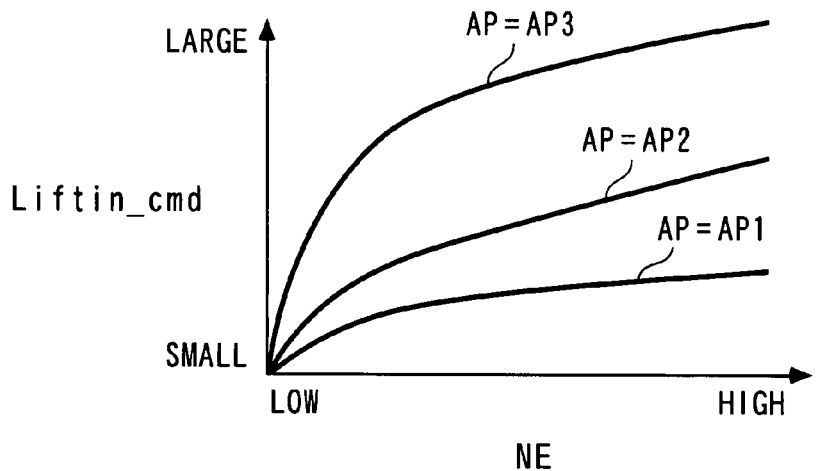
FIG. 16 is a diagram showing an example of a map for use in calculating a target maximum lift Liftin_cmd during normal operation of the engine.

On the other hand, if the answer to the question of the step 9 or the step 10 is negative (NO), i.e. if the accelerator pedal is stepped on, or if the Tcat≧Tcatlmt holds, the target maximum lift Liftin_cmd is calculated by searching a map shown in FIG. 16 according to the engine speed NE and the accelerator pedal opening AP (step 14). In FIG. 16, AP1 to AP3 indicate predetermined values of the accelerator pedal opening AP (AP1<AP2<AP3).

In this map, the target maximum lift Liftin_cmd is set to a larger value as the engine speed NE is higher, or as the accelerator pedal opening AP is larger. This is because as the engine speed NE is higher, or as the accelerator pedal opening AP is larger, an output required of the engine 3 is larger, and hence a larger intake air amount is required.

Figure 17:
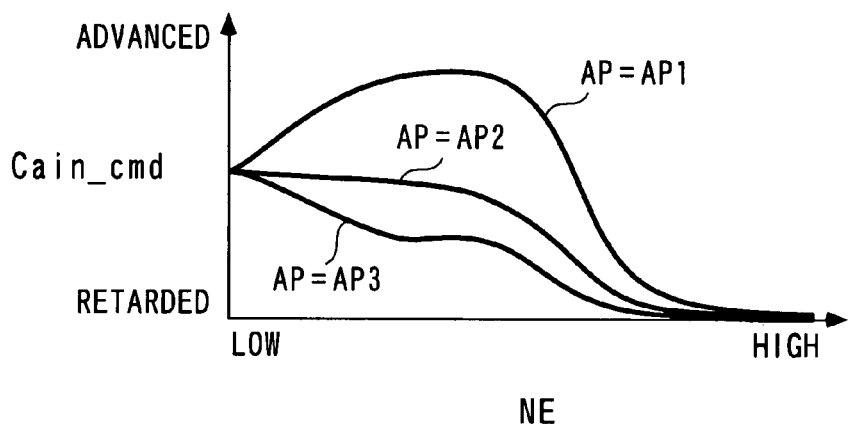
FIG. 17 is a diagram showing an example of a map for use in calculating a target cam phase Cain_cmd during normal operation of the engine.

Then, the target cam phase Cain_cmd is calculated by searching a map shown in FIG. 17 according to the engine speed NE and the accelerator pedal opening AP (step 15). In this map, when the accelerator pedal opening AP is small and the engine speed NE is in the medium rotational speed region, the target cam phase Cain_cmd is set to a more advanced value than otherwise. This is to improve fuel economy by reducing pumping loss by increasing the amount of internal EGR gas under the above operating conditions of the engine 3.

Figure 18:
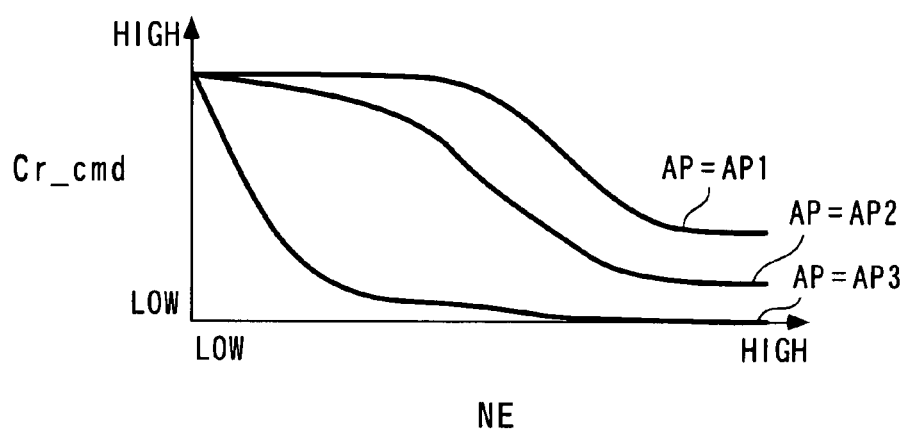
FIG. 18 is a diagram showing an example of a map for use in calculating a target compression ratio Cr_cmd during normal operation of the engine.

Next, the target compression ratio Cr_cmd is calculated by searching a map shown in FIG. 18 according to the engine speed NE and the accelerator opening AP (step 16), and the step 6 et seq. are executed. In this map, the target compression ratio Cr_cmd is set to a smaller value as the engine speed NE is higher, and accelerator opening AP is larger. This is because as the load on the engine is higher, knocking is more likely to occur, and hence is to prevent occurrence of knocking by controlling the Cr toward lower compression ratio, while preventing lowering of the combustion efficiency due to excessive retardation of the ignition timing.

On the other hand, if the answer to the question of the step 1 is affirmative (YES), i.e. if at least one of the three variable mechanisms 50 is faulty, the lift control input U_Liftin is set to the predetermined failure-time value U_Liftin_fs; the phase control input U_Cain to the predetermined failure-time value U_Cain_fs; the compression ratio control input U_Cr to the predetermined failure-time value U_Cr_fs, followed by terminating the present process (step 17). As a result, as described above, the maximum lift Liftin is held at the minimum value Liftinmin, the cam phase Cain at the predetermined lock value, and the compression ratio Cr at the minimum value Crmin, whereby it is possible to suitably carry out idling or starting of the engine during stoppage of the vehicle, and at the same time hold the vehicle in the state of low-speed traveling when the vehicle is traveling.

Figure 19:
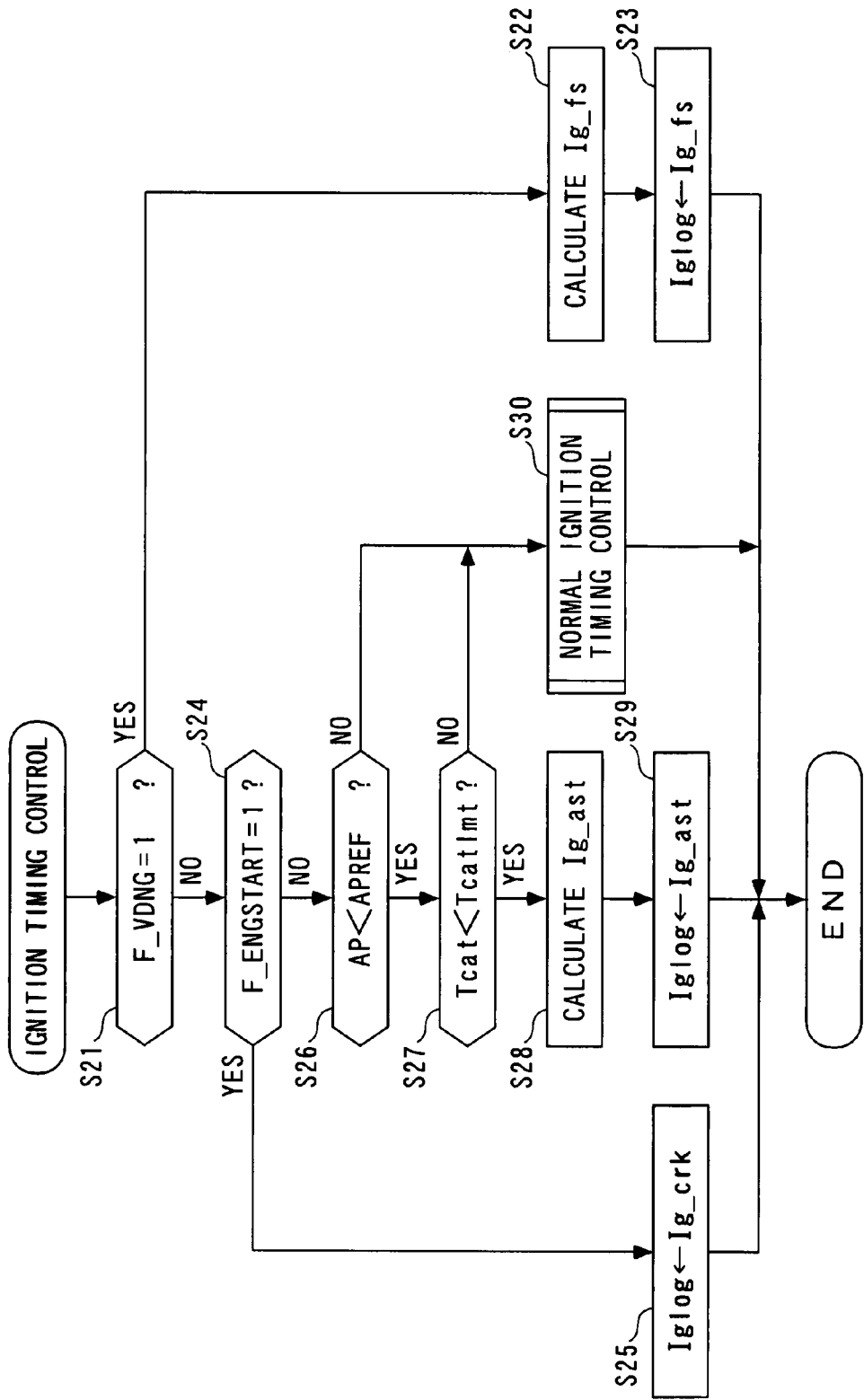
FIG. 19 is a flow diagram of an ignition timing control process.

Next, the ignition timing control process for controlling the ignition timing Iglog will be described with reference to FIG. 19. The present process is executed in synchronism with generation of each pulse of the TDC signal. First, in a step 21, it is determined whether or not the aforementioned variable mechanism failure flag F_VDNG is equal to 1. If the answer to this question is affirmative (YES), i.e. if at least one of the three variable mechanisms is faulty, a failure-time value Ig_fs is calculated (step 22), and the calculated failure-time value Ig_fs is set to the ignition timing Iglog (step 23), followed by terminating the present process. It should be noted that the failure-time value Ig_fs is calculated with a predetermined feedback control algorithm such that the engine speed NE becomes equal to a predetermined failure-time target engine speed (e.g. 2000 rpm).

On the other hand, if the answer to the question of the step 21 is negative (NO), i.e. if all the three variable mechanisms are normal, it is determined whether or not the aforementioned engine start flag F_ENGSTART is equal to 1 (step 24). If the answer to the question is affirmative (YES), i.e. if the engine starting control is being executed, the ignition timing Iglog is set to a predetermined start-time value Ig_crk (e.g. BTDC 10°) for starting of the engine 3 (step 25), followed by terminating the present process.

On the other hand, if the answer to the question of the step 24 is negative (NO), i.e. if the engine starting control is not being executed, the process proceeds to a step 26, wherein it is determined whether or not the accelerator pedal opening AP is smaller than the predetermined value APREF used in the step 9. If the answer to the question is affirmative (YES), i.e. if the accelerator pedal is not stepped on, it is determined whether or not the count Tcat of the above-mentioned catalyst warm-up timer is smaller than a predetermined value Tcatlmt (e.g. 30 seconds) (step 27).

If the answer to this question is affirmative (YES), i.e. the catalyst warmup control is being executed, a catalyst warmup value Ig_ast is calculated (step 28). The catalyst warmup value Ig_ast is calculated with a predetermined feedback control algorithm such that the engine speed NE becomes equal to a predetermined target engine speed (e.g. 1800 rpm) for warming up the catalyst. Then, the ignition timing Iglog is set to the catalyst warmup value Ig_ast (step 29), followed by terminating the present process.

On the other hand, if the answer to the question of the step 26 or the step 27 is negative (NO), i.e. if the accelerator pedal is stepped on, or if Tcat≧Tcatlmt holds, a normal ignition timing control process is carried out (step 30), followed by terminating the present process.

Figure 20:
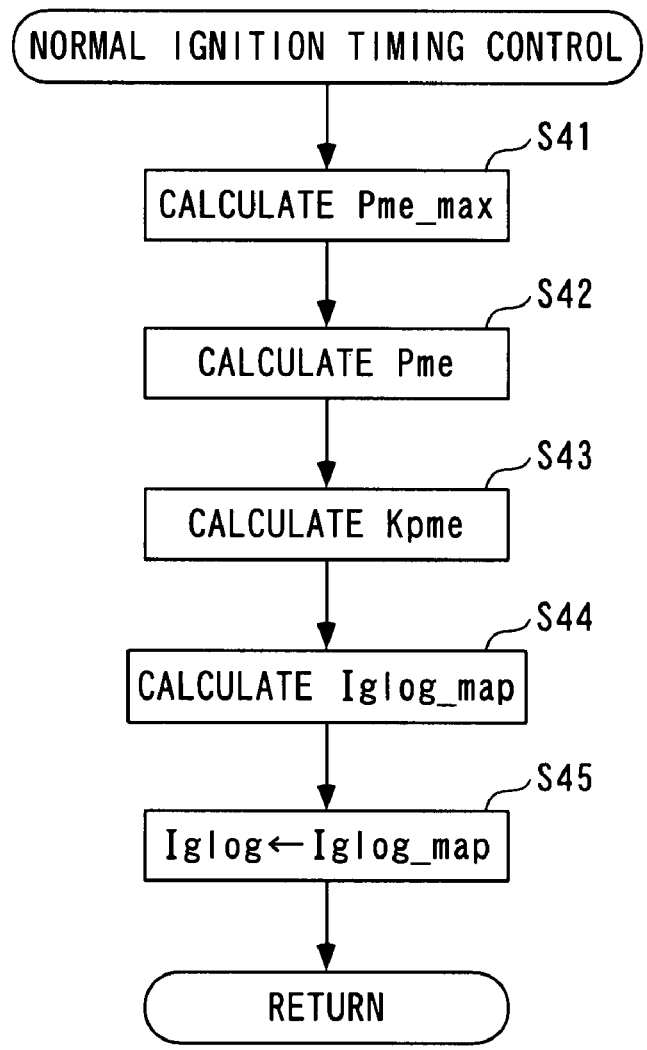
FIG. 20 is a flow diagram of a subroutine for a normal ignition timing control process executed in the process shown in FIG. 19.

FIG. 20 shows the normal ignition timing control process. First, in a step 41, a maximum mean effective pressure Pme_max is calculated. The maximum mean effective pressure Pme_max is the maximum value of net mean effective pressure of the engine which can be output when the engine is at the current engine speed NE detected at the time. The net mean effective pressure is a value obtained by dividing the work done per one combustion cycle corresponding to the brake horsepower of the engine 3 by the total piston displacement of the engine 3. In the present embodiment, the maximum mean effective pressure Pme_max corresponds to the maximum torque parameter.

Figure 21:
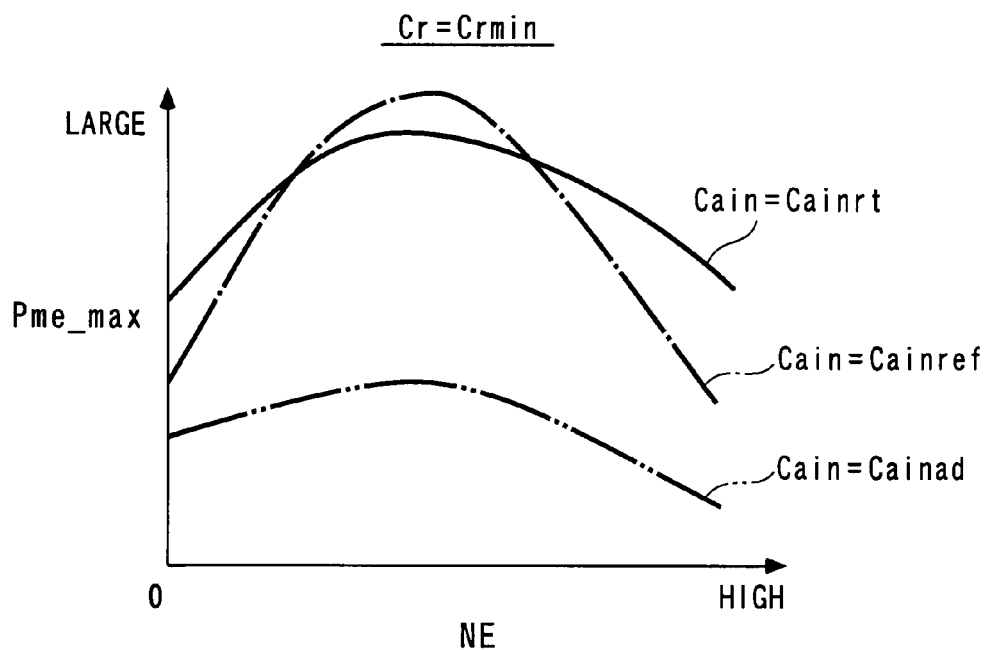
FIG. 21 is a diagram of an example of a Pme_max map for Cr=Crmin for use in the process in FIG. 20.
Figure 22:
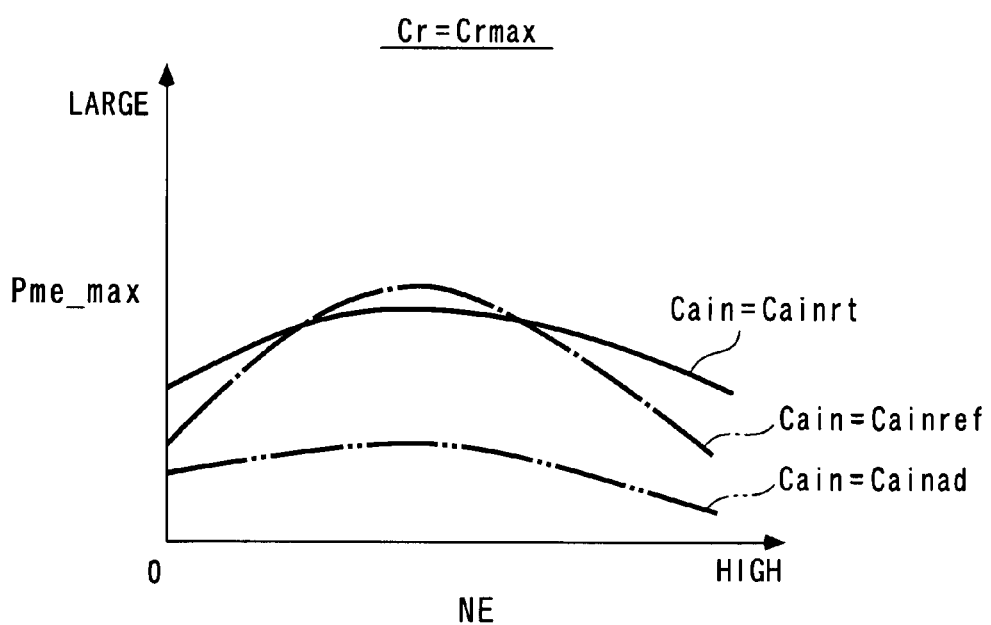
FIG. 22 is a diagram of an example of a Pme_max map for Cr=Crmax for use in the process in FIG. 20.
Figure 23:
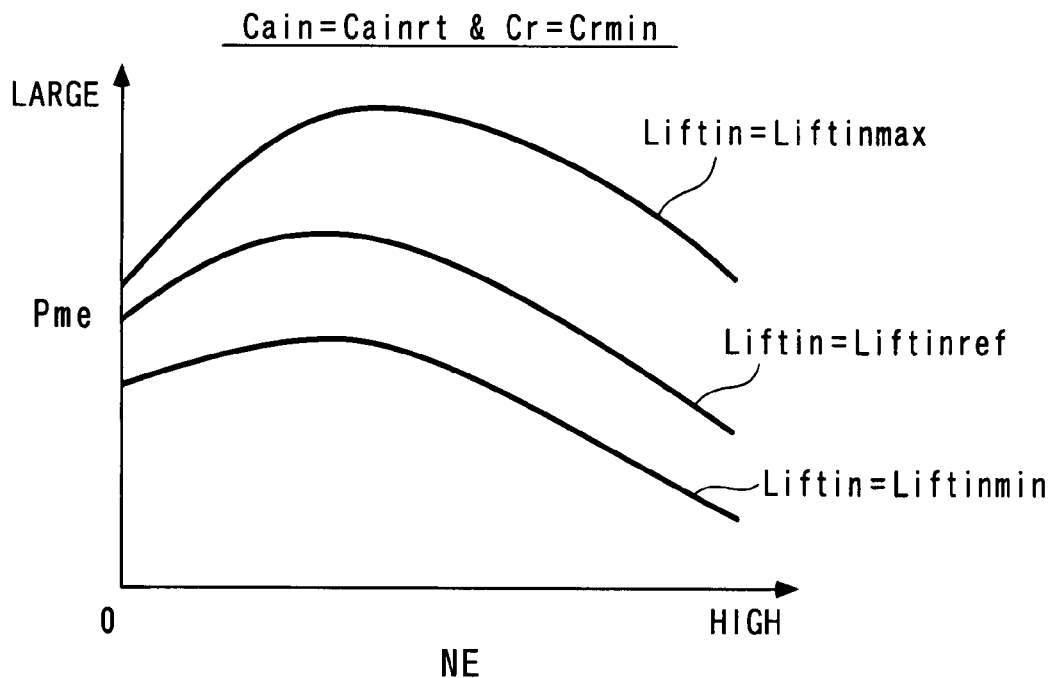
FIG. 23 is a diagram of an example of a Pme map for Cain=Cainrt&Cr=Crmin for use in the process in FIG. 20.
Figure 24:
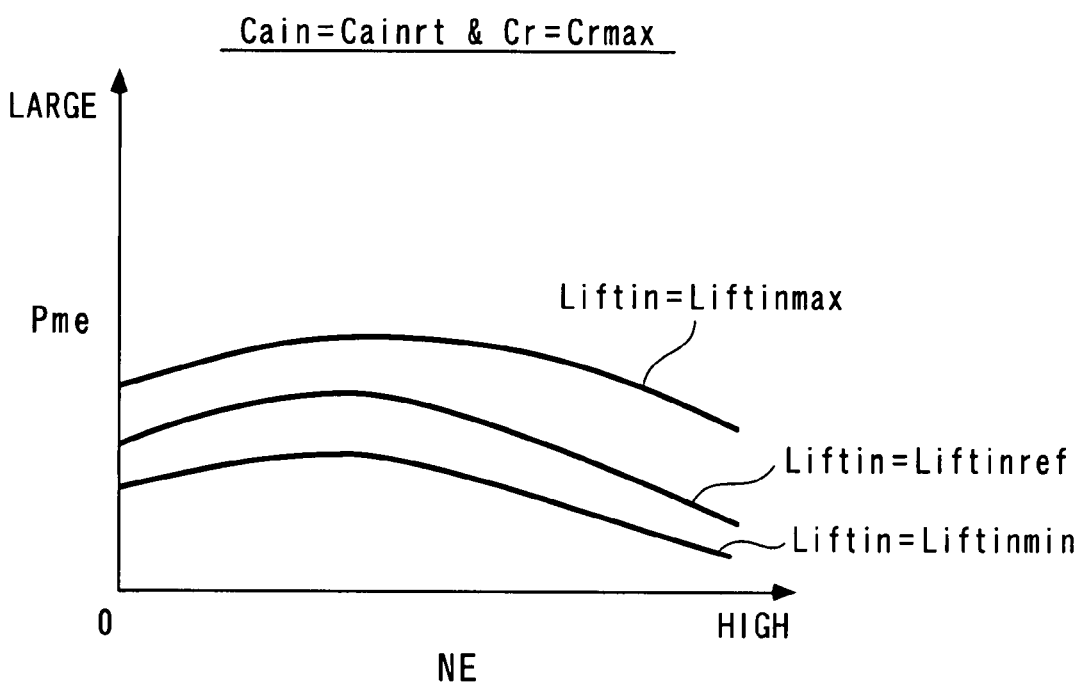
FIG. 24 is a diagram of an example of a Pme map for Cain=Cainrt&Cr=Crmax for use in the process in FIG. 20.
Figure 25:
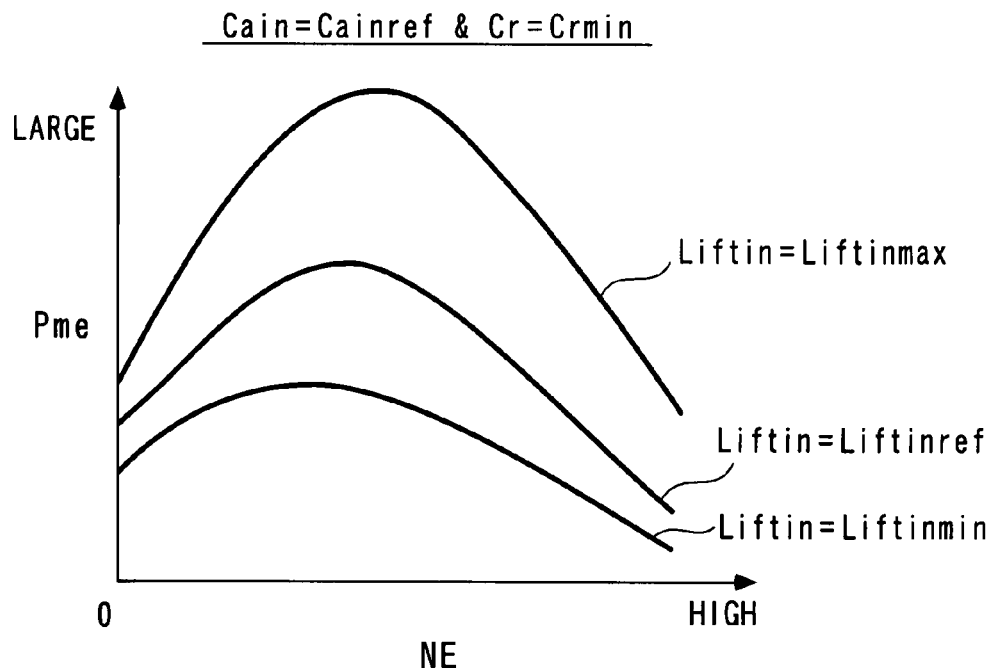
FIG. 25 is a diagram of an example of a Pme map for Cain=Cainref&Cr=Crmin for use in the process in FIG. 20.
Figure 26:
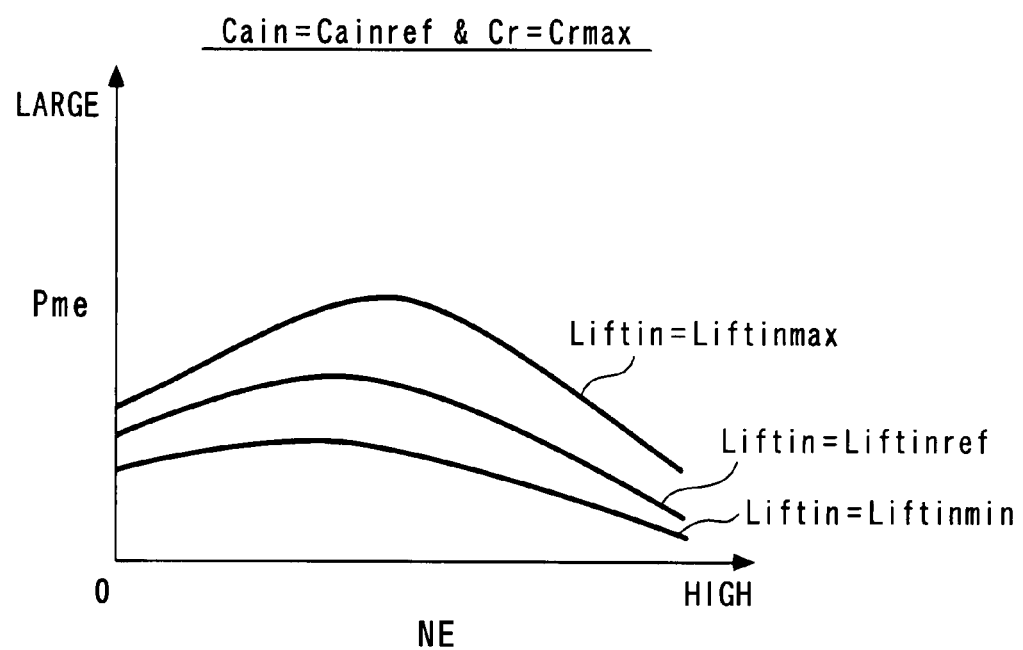
FIG. 26 is a diagram of an example of a Pme map for Cain=Cainref&Cr=Crmax for use in the process in FIG. 20.
Figure 27:
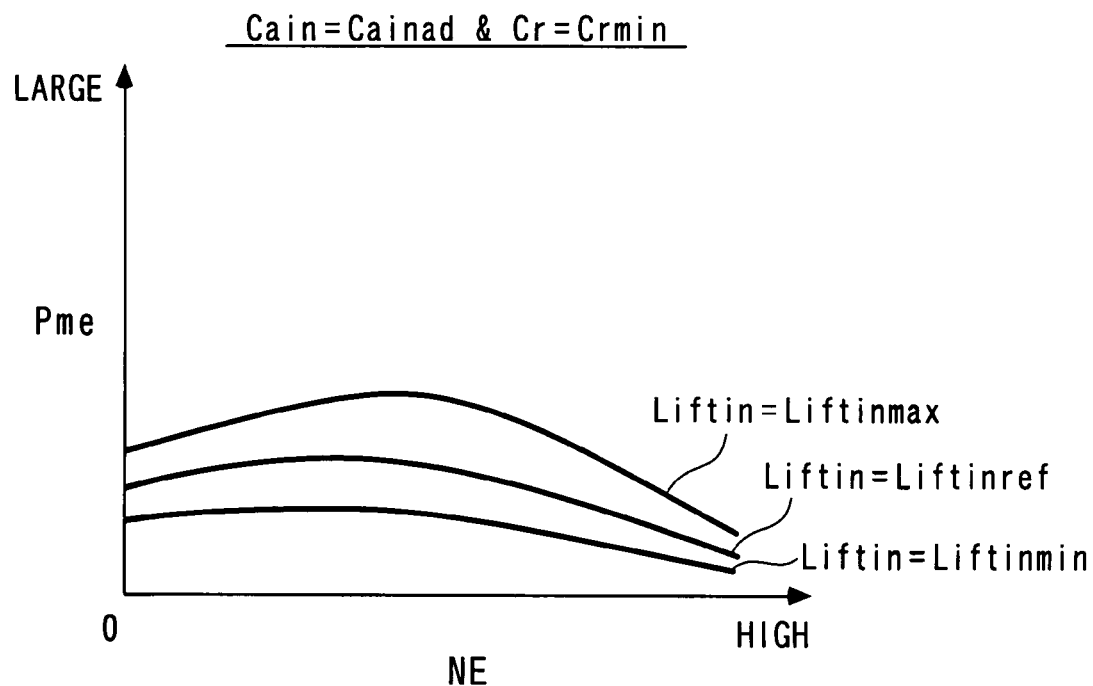
FIG. 27 is a diagram of an example of a Pme map for Cain=Cainad&Cr=Crmin for use in the process in FIG. 20.
Figure 28:
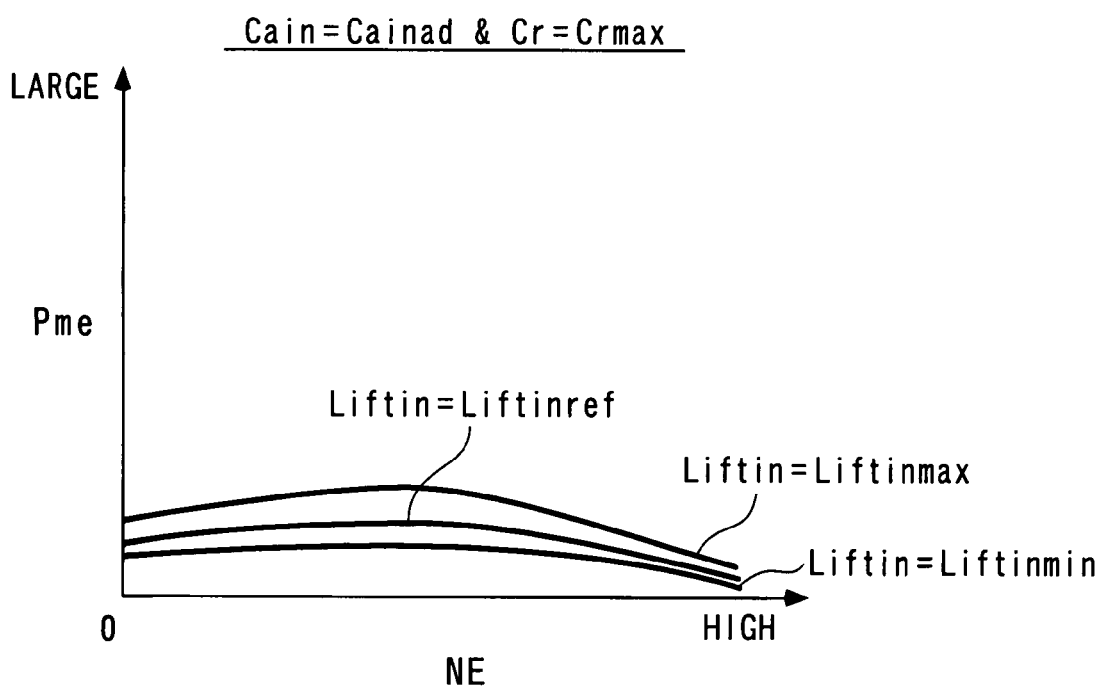
FIG. 28 is a diagram of an example of a Pme map for Cain=Cainad&Cr=Crmax for use in the process in FIG. 20.

Specifically, the maximum mean effective pressure Pme_max is calculated by searching a Pme_max map according to the engine speed NE, the cam phase Cain, and the compression ratio Cr. The Pre_max map is formed by empirically determining values of the net mean effective pressure obtained when the maximum lift Liftin is equal to the maximum value Liftinmax, according to the engine speed NE, the cam phase Cain, and the compression ratio Cr, and forming the values into a map. The Pme_max map is formed by a map for Crmin shown in FIG. 21 for use when the compression ratio assumes the minimum value Crmin, and a map for Crmax shown in FIG. 22 for use when the compression ratio Cr assumes the maximum value. Further, these maps are each formed by three maps, i.e. one for the most retarded value Cainrt of the cam phase Cain, one for the most advanced value Cainad of the same, and one for a predetermined intermediate value Cainref between the most retarded value Cainrt and the most advanced value Cainad.

In these maps, the maximum mean effective pressure Pre_max is set to the largest value in a medium engine speed region where the engine speed NE is approximately medium. Further, the maximum mean effective pressure Pre_max is basically set to a smaller value as the cam phase Cain is more advanced. This is because as the cam phase Cain is more advanced, the opening timing of the intake valve 4 is advanced, so that the amount of internal EGR gas becomes larger to reduce the intake air amount QA.

Further, as an exception to the above, in the medium engine speed region, the maximum mean effective pressure Pre_max for the most retarded value Cainrt is set to a smaller value than one for the intermediate value Cainref. This is because when Cain=Cainrt holds in the medium engine speed region, the closing timing of the intake valve 4 is later than when Cain=Cainref holds, which increases the amount of return air which is returned from within the cylinder 3a into the intake pipe 12, causing lowering of the charging efficiency. It should be noted that in a high engine speed region, since the inertia of the intake air is so large that no such return of intake air as described above (hereinafter referred to as "the intake air return") does not occur, which makes the charging efficiency higher, and hence the maximum mean effective pressure Pme_max is set to the largest value.

Further, the maximum mean effective pressure Pme_max for Crmin is generally set to a larger value than that for Crmax. This because as the compression ratio Cr is lower, the piston displacement is larger, as mentioned hereinabove. It should be noted that when the cam phase Cain is between the most retarded value Cainrt and the intermediate value Cainref or between the intermediate value Cainref and the most advanced value Cainad, the maximum mean effective pressure Pme_max is calculated by interpolation.

Next, the net mean effective pressure Pme is calculated by searing a Pme map according to the engine speed NE, the maximum lift Liftin, the cam phase Cain, and the compression ratio Cr (step 42). The net mean effective pressure Pme is a value obtained by dividing the work done per one combustion cycle corresponding to the brake horsepower of the engine 3 by the total piston displacement of the engine 3. In the present embodiment, the net mean effective pressure Pme corresponds to the output torque parameter.

As shown in FIGS. 23 to 28, the Pme map is formed by six maps set for combinations between three cam phases (the most retarded value Cainrt, the intermediate value Cainref, and the most advanced value Cainad) and two compression ratios Cr (the minimum value Crmin and the maximum value Crmax). Further, these maps are each formed by three maps, i.e. a map for the maximum value Liftinmax of the maximum lift Liftin, a map for the minimum value Liftinmin of the same, and a map for a predetermined intermediate value Liftinref between the maximum value Liftinmax and the minimum value Liftinmin. Further, in these maps, the net mean effective pressure Pme is set with respect to the engine speed NE, the cam phase Cain, and the compression ratio Cr, similarly to the above-described maximum mean effective pressure Pme_max. Further, since as the maximum lift Liftin is larger, the intake air amount is larger, and hence the net mean effective pressure Pme is set to a larger value.

It should be noted that when the compression ratio Cr is between the minimum value Crmin and the maximum value Crmax, when the cam phase Cain is between the most retarded value Cainrt and the intermediate value Cainref or between the intermediate value Cainref and the most advanced value Cainad, and when the maximum lift Liftin is between the minimum value Liftinmin and the intermediate value Liftinref or between the intermediate value Liftinref and the maximum value Liftinmax, the net mean effective pressure Pme is calculated by interpolation.

Next, a normalized mean effective pressure Kpme (=Pme/Pme_max) is calculated by dividing the net mean effective pressure Pme by the maximum mean effective pressure Pme_max (step 43). In the present embodiment, the normalized mean effective pressure Kpme corresponds to the torque ratio. Next, a map value Iglog_map of the ignition timing is calculated by searching an Iglog map according to the calculated normalized mean effective pressure Kpme, the engine speed NE, the cam phase Cain, and the compression ratio Cr (step 44). Next, the calculated map value Iglog_map of the ignition timing is set to the ignition timing Iglog (step 45), followed by terminating the present process.

As shown in FIGS. 29 to 34, similarly to the Pme map, the Iglog map is formed by six maps set for combinations between Cain=Cainrt, Cain=Cainref, and Cain=Cainad, and Cr=Crmin and Cr=Crmax. Further, these maps are each formed by three maps set for respective first to third engine speeds NE1 to NE3 (NE1<NE2<NE3). In each map, a high-load region (enclosed by broken line) where the normalized mean effective pressure Kpme is a range of values equal or close to 1 corresponds to a knock region where knocking is liable to occur, and in this region, the number of grid points to each of which a map value Iglog_map is set to be larger than in other regions.

Hereafter, the tendency of the map values Iglog_map set to each map will be described with reference to FIGS. 29 to 34. First, in the map for Cain=Cainrt & Cr=Crmin (most retarded and low compression ratio), when the engine speed NE is equal to the first engine speed NE1 which is the lowest of the three, the map value Iglog_map is set to be more retarded as the normalized mean effective pressure Kpme is larger, i.e. as the load is higher, for prevention of occurrence of knocking, in a region where the normalized mean effective pressure Kpme is smaller than a first predetermined value Kpme1 in the knock region.

Further, when NE=NE1 holds, in a region where Kpme≧Kpme1 holds, inversely to the above, the map value Iglog_map is set to be more advanced as the normalized mean effective pressure Kpme is larger. This is for the following reason: In the region where the normalized mean effective pressure Kpme is not smaller than the first predetermined value Kpme1, i.e. in the high-load region, as described above, to obtain the larger intake air amount, the maximum lift Liftin is set to a larger value. In this case, as is clear from the lift curve of the intake valve 4 in FIG. 7, the amount of internal EGR gas increases by advanced opening timing of the intake valve 4, and the amount of return air increases by retarded closing timing of the same, which makes knocking more difficult to occur.

Figure 29:
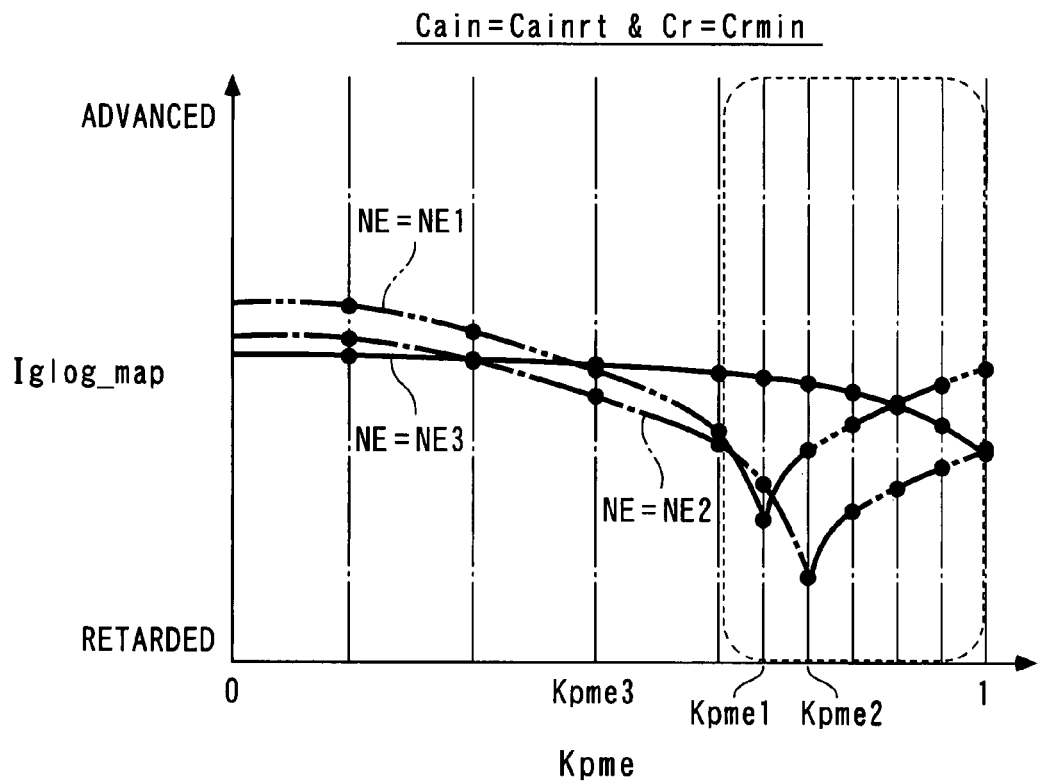
FIG. 29 is a diagram of an example of a Iglog_map for Cain=Cainrt&Cr=Crmin for use in the process in FIG. 20.

Further, in the case where the engine speed NE is equal to the second engine speed NE2 which is the intermediate one of the three, the map value Iglog_map is set with the same tendency as in the case of NE=NE1 for the same reason as described as to the case of NE=NE1, and in a region where Kpme<second predetermined value Kpme2 holds, the map value Iglog_map is set to be more retarded as the normalized mean effective pressure Kpme is larger. Further, in a region where the normalized mean effective pressure Kpme is not smaller than the second predetermined value Kpme2, the map value Iglog_map is set to be more advanced as the normalized mean effective pressure Kpme is larger. Further, as shown in FIG. 29, the second predetermined value Kpme2 at which the map value Iglog_map is switched from the retarded side to the advanced side is larger than the first predetermined value Kpme1 for NE=NE1 because compared with the case of NE=NE1, the engine speed NE is higher, and hence the inertia of the intake air is larger to cause reduction of the amount of return air, and the charging efficiency is higher to make the temperature of the mixture more difficult to be lowered by the influence of the internal EGR gas.

Further, when the engine speed NE is equal to the third engine speed NE3 which is the highest of the three, the map value Iglog_map is set to a more retarded value as the normalized mean effective pressure kpme is larger for prevention of occurrence of knocking, over the whole Kpme region. This is because when NE=NE3 holds, the repetition period of one combustion cycle becomes shorter, so that the degree of cooling of the temperature of the cylinder block 3h (hereinafter referred to as "cylinder wall temperature") by engine coolant is lower, and as described above, due to large inertia of intake air, the return of intake air does not occur.

Further, when compared between NE=NE1 to NE=NE3, the map value Iglog_map is set to a more retarded value as the engine speed NE is higher in a low-load region where the normalized mean effective pressure Kpme is close to 0. This is because in the low-load region, the charging efficiency is higher as the engine speed NE is higher, and the temperature of the mixture during compression stroke (hereinafter referred to as "the compression-stroke mixture temperature") is higher due to the higher cylinder wall temperature caused by the shorter repetition period of one combustion cycle, which make knocking more liable to occur. Further, in a region where the normalized mean effective pressure Kpme is between a third predetermined value Kpme3 and the second predetermined value Kpme2, i.e. in a medium-to-high load region, when NE=NE1 or NE=NE2 holds (low-to-medium engine speed), the map value Iglog_map is set to a more retarded value than when NE=NE3 holds (high engine speed). This is because in the medium-to-high load region, when the engine speed is high, the time required for the intake stroke becomes shorter with respect to the flow velocity of intake air, which makes the charging efficiency lower, whereas when the engine speed is low to medium, the relationship between the velocity of intake air and the time required for the intake stroke is well-balanced, which makes the charging efficiency higher to make knocking more liable to occur.

Next, a description will be given of a map for Cain=Cainrt & Cr=Crmax (most retarded and high compression ratio) shown in FIG. 30. In this map, in any of the cases NE=NE1, NE=NE2, and NE=NE3, the map value Iglog_map is set to a more retarded value as the normalized mean effective pressure Kpme is larger, over the whole Kpme region. This is because due to high compression ratio Cr, knocking becomes more liable to occur before the amount of internal EGR gas and the amount of return air increase. Further, the map value Iglog_map is set to a more retarded value as the engine speed NE is higher. This is because as the engine speed NE is higher, the charging efficiency is higher, and due to the shorter repetition period of one combustion cycle, the compression-stroke mixture temperature is higher, which makes knocking liable to occur.

Further, the map value Iglog_map is basically set a retarded value than in the case of low compression ratio shown in FIG. 29 since knocking is more liable to occur since the compression-stroke mixture temperature is high due to high compression ratio Cr. It should be noted that insofar as the knocking region for NE=NE1 or NE2 is concerned, the map value Iglog_map is set to an advanced value than in the case of FIG. 29. This is because in the case of the compression ratio Cr being equal to the maximum value Crmax, compared with the case of the same being equal to the minimum value Crmin, the net mean effective pressure Pme and the maximum mean effective pressure Pme_max are smaller, and hence even with the same normalized mean effective pressure Kpme, the net mean effective pressure, i.e. load is small, which makes knocking difficult to occur.

Figure 31:
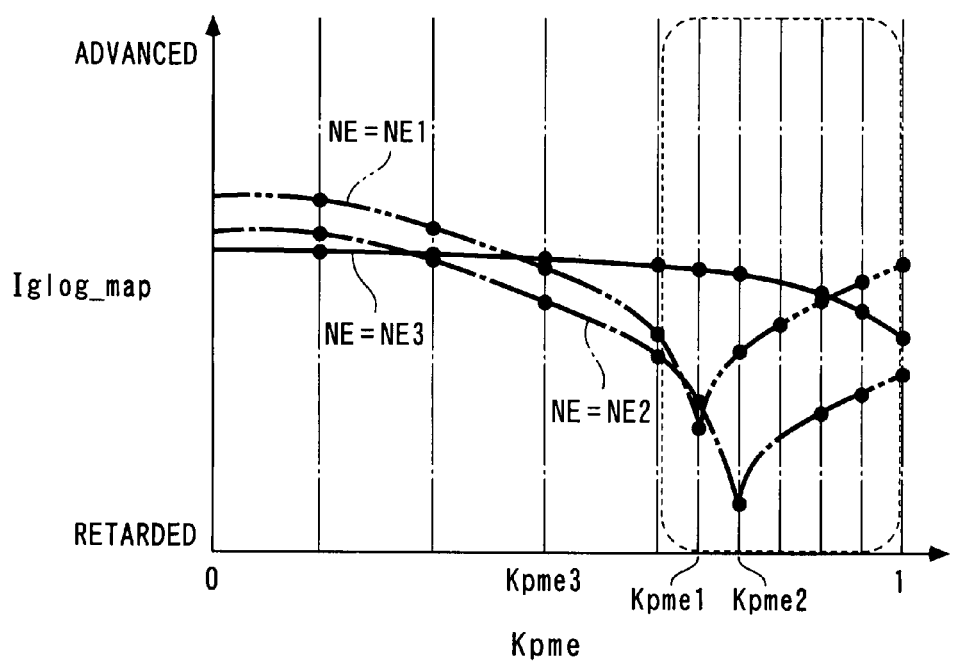
FIG. 31 is a diagram of an example of a Iglog_map for Cain=Cainref&Cr=Crmin for use in the process in FIG. 20.

Next, a description will be given of a map for Cain=Cainref & Cr=Crmin (medium phase and low compression ratio) shown in FIG. 31. In this map, the map value Iglog_map is set substantially in the same manner as in the case of the map for Cain=Cainrt & Cr=Crmin (most retarded and low compression ratio) in FIG. 29 which is different only in the aforementioned cam phase Cain. Hereafter, through comparison with the FIG. 29 map, a description will be mainly given of different settings therefrom.

In a low-load region where the normalized mean effective pressure Kpme is close to 0, the map value Iglog_map is set to a more advanced value in the case of FIG. 29. This is because compared with the case of the cam phase Cain being equal to the most retarded value Cainrt, the cam phase Cain is advanced to advance the opening timing of the intake valve 4, which increases the amount of internal EGR gas to lower the compression-stroke mixture temperature, causing slower combustion rate of the mixture. It should be noted that in the case of NE=NE3 (high engine speed), the map value Iglog_map is set to an advanced value than in the case of FIG. 29 over the whole Kpme region. This is because the charging efficiency is lower than in the case of FIG. 29, and hence knocking is difficult to occur.

Further, in the knock region, when NE=NE2 holds (medium engine speed), compared with the FIG. 29 case, the charging efficiency is higher, so that to prevent occurrence of knocking, the map value Iglog_map is set to a more retarded value. Further, when NE=NE1 or NE2 (low-to-medium engine speed), compared with the FIG. 29 case, the charging efficiency is higher, making knocking more liable to occur, and hence the degree of retardation of the map value Iglog_map relative to an increase in the normalized mean effective pressure Kpme is made larger. Further, accordingly, the degree of advancing the map value Iglog_map due to the influence of internal EGR gas is made larger.

Figure 32:
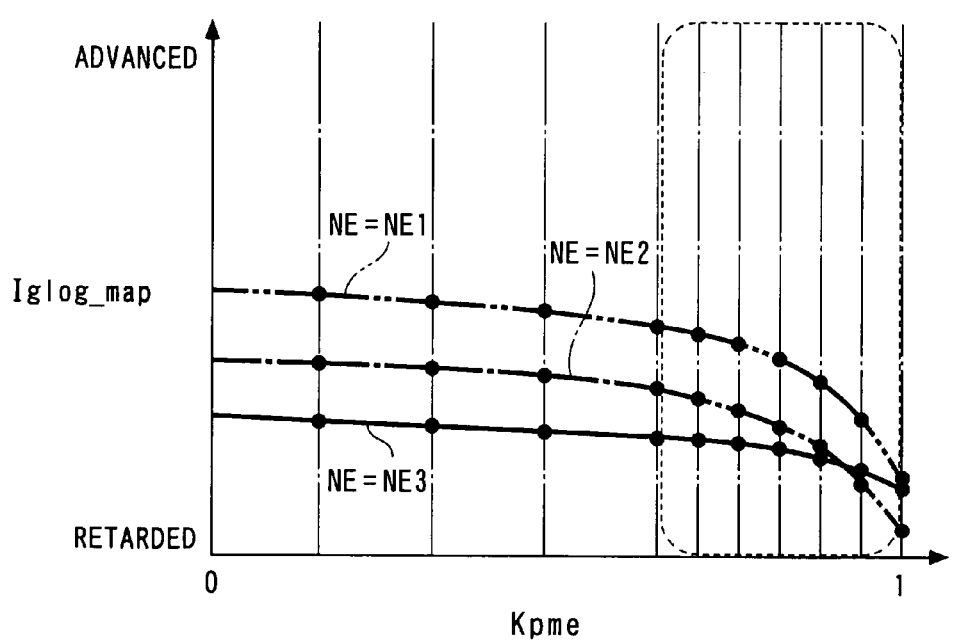
FIG. 32 is a diagram of an example of a Iglog_map for Cain=Cainref&Cr=Crmax for use in the process in FIG. 20.

Next, a description will be given of a map for Cain=Cainref & Cr=Crmax (medium phase and high compression ratio) shown in FIG. 32. In this map, the map value Iglog_map is set substantially in the same manner as in the case of the map for Cain=Cainrt & Cr=Crmax (most retarded and high compression ratio) in FIG. 30 which is different only in the aforementioned cam phase Cain. Hereafter, through comparison with the FIG. 30 map, a description will be mainly given of different settings therefrom.

Figure 30:
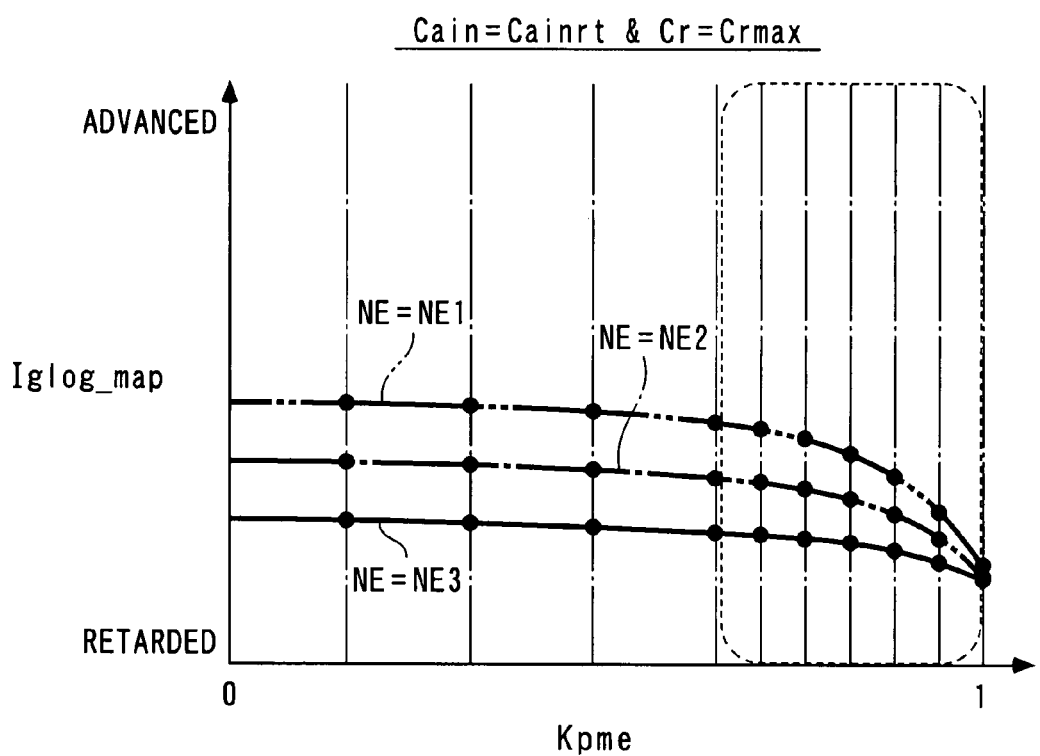
FIG. 30 is a diagram of an example of a Iglog_map for Cain=Cainrt&Cr=Crmax for use in the process in FIG. 20.

In a low-load region where the normalized mean effective pressure Kpme is close to 0, the map value Iglog_map is set to a more advanced value than in the case of FIG. 30 since the cam phase Cain is more advanced to increase the amount of internal EGR gas, causing lower combustion rate of the mixture. Further, in the knock region, when NE=NE2 holds (medium engine speed), compared with the FIG. 30 case, the charging efficiency is higher, so that to prevent occurrence of knocking, the map value Iglog_map is set to a more retarded value.

Figure 33:
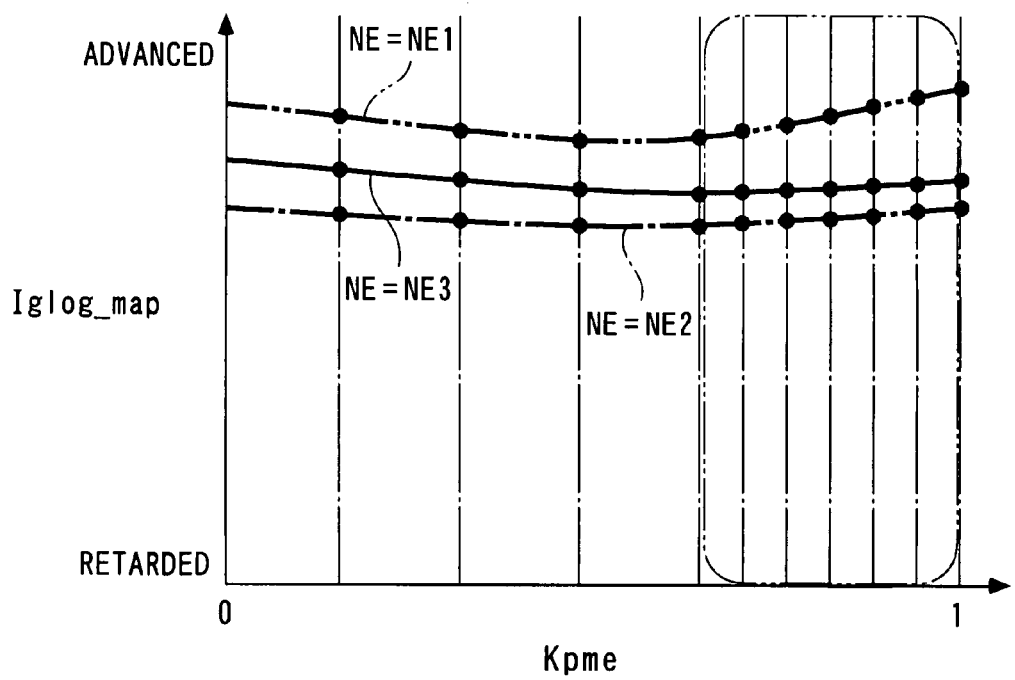
FIG. 33 is a diagram of an example of a Iglog_map for Cain=Cainad&Cr=Crmin for use in the process in FIG. 20.
Figure 34:
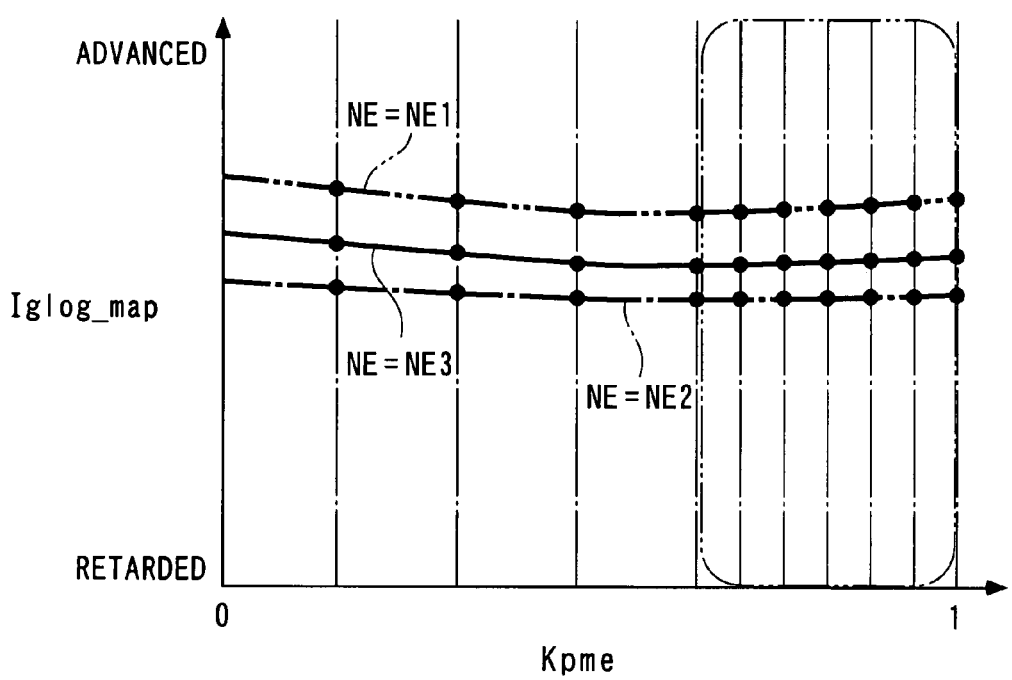
FIG. 34 is a diagram of an example of a Iglog_map for Cain=Cainad&Cr=Crmax for use in the process in FIG. 20.
Figure 35:
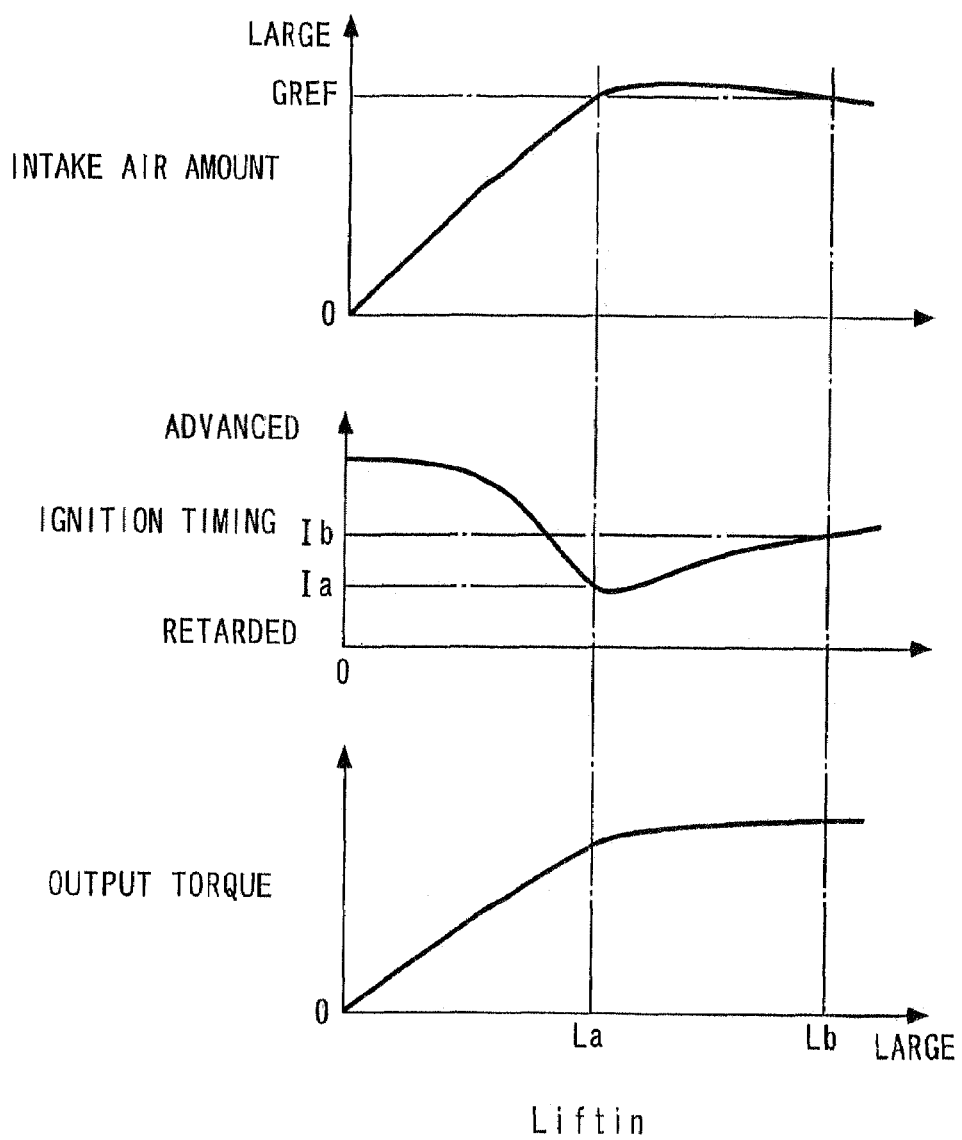
FIG. 35 is a diagram useful in explaining an example of conventional control of ignition timing.
Figure 36:
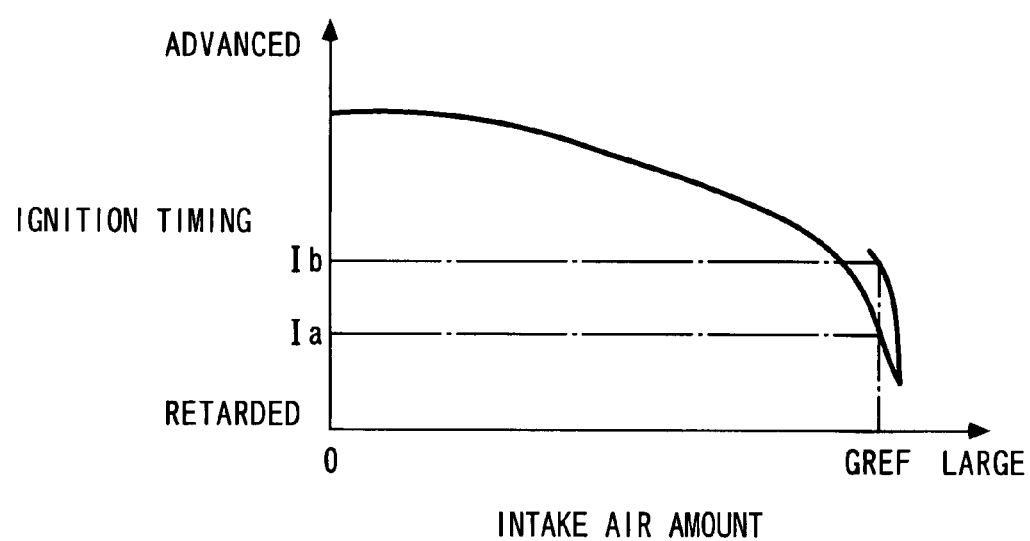
FIG. 36 is a diagram illustrating a relationship between the amount of intake air and ignition timing.
Figure 37:
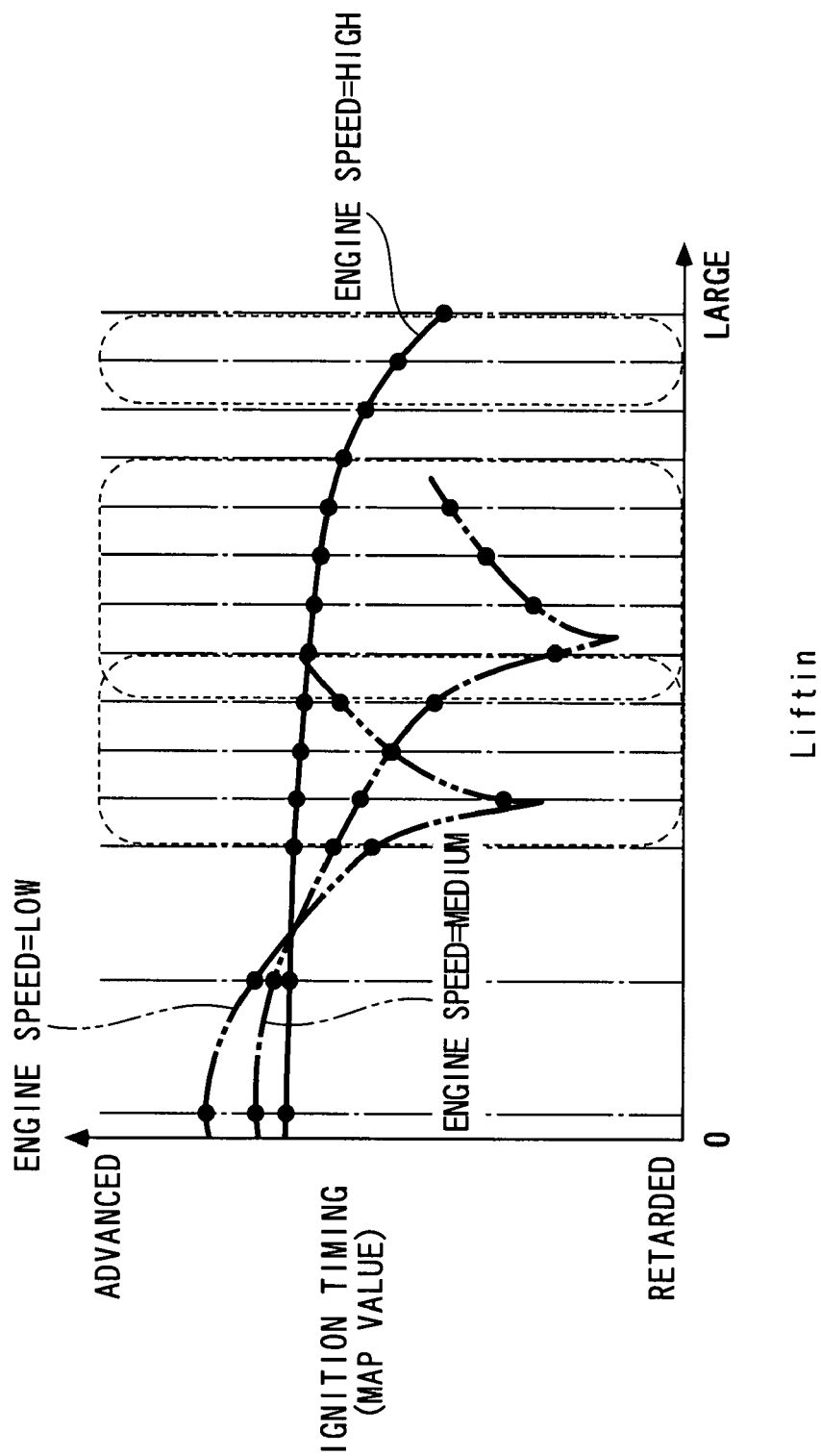
FIG. 37 is a diagram of an example of a map formed by mapping ignition timing according to the maximum lift Liftin and the engine speed.

Next, a description will be given of a map for Cain=Cainad & Cr=Crmin (most advanced and low compression ratio) shown in FIG. 33 and a map for Cain=Cainad & Cr=Crmax (most advanced and high compression ratio) shown in FIG. 34. In these maps, the map value Iglog_map is set to a more advanced value than in the FIGS. 29 to 32 cases in which the cam phase Cain is equal to the most retarded value Cainrt or the intermediate value Cainref. This is because when the cam phase Cain is equal to the most advanced value Cainad, the opening timing of the intake valve 4 is advanced to increase the amount of internal EGR gas, which makes combustion unstable, and hence is to make combustion stable by advancing the ignition timing Iglog.

Further, in a predetermined high-load region where the normalized mean effective pressure Kpme is in a range of values equal or close to 1 (region enclosed by two-dot chain line), as the normalized mean effective pressure Kpme is larger, the maximum lift Liftin is larger, which makes the opening timing of the intake valve 4 still earlier, to make the amount of internal EGR gas much larger, so that although knocking does not occur, the combustion becomes liable to degrade. To solve the problem, in this high-load region, similarly to the aforementioned knock region, the number of grid points to each of which the map value Iglog_map is set is configured to be larger. Further, in the high-load region, the map value Iglog_map is set to a more advanced value as the normalized mean effective pressure Kpme is larger, differently from the FIGS. 29 to 32 cases.

Further, in the case of NE=NE2 (medium engine speed), the charging efficiency is highest to make the mixture easier to burn, and hence the map value Iglog_map is set to a retarded value. Further, in the case of NE=NE1 (low engine speed), the map value Iglog_map is set to an advanced value than in the case of NE=NE3 (high engine speed). This is because when NE=NE1 holds, compared with the case of NE=NE3, the fluidity of intake air in the cylinder 3a is smaller, to make the combustion rate lower, and hence the ignition timing Iglog is set to a more advanced value to increase the combustion rate and improve the combustion efficiency. Further, in the case of Cr=Crmax, compared with the case of Cr=Crmin, the compression ratio Cr is higher, so that the mixture during compression is higher in temperature and easier to burn, and hence the map value Iglog_map is set to a more retarded value.

It should be noted that when the compression ratio Cr is between the minimum value Crmin and the maximum value Crmax; the cam phase Cain is between the most retarded value Cainrt and the intermediate value Cainref or between the intermediate value Cainref and the most advanced value Cainad; and when the maximum lift Liftin is between the minimum value Liftinmin and the intermediate value Liftinref or between the intermediate value Liftinref and the maximum value Liftinmax, the map value Iglog_map is calculated by interpolation.

As described heretofore, according to the present embodiment, the map value Iglog_map of ignition timing is set using the normalized mean effective pressure Kpme and the engine speed NE as parameters. Therefore, as shown in FIGS. 29 to 32, the knock regions where knocking is liable to occur are regions where the normalized mean effective value Kpme is in a range of values equal or close to 1. Therefore, compared with the case where the aforementioned maximum lift Liftin is used as a parameter, it is possible to reduce the number of values to be set as the map value Iglog_map (number of grid points indicated by black dots in the figures), and hence it is possible to reduce the capacity of a memory required in the ignition timing control system 1, and the man-hours for preparing the maps, thereby enabling reduction of manufacturing costs of the ignition timing control system 1. Further, for the same reason, differently from the aforementioned conventional cases where the ignition timing Iglog is determined according to the intake air amount, it is possible to always determine appropriate ignition timing, which makes it possible to obtain the optimum combustion efficiency to ensure sufficient output torque with stability.

Further, the maximum mean effective pressure Pme_max is calculated according to the cam phase Cain and the compression ratio Cr, and the net mean effective pressure Pme is calculated according to the maximum lift Liftin, the cam phase Cain, and the compression ratio Cr. Therefore, it is possible to properly set the ignition timing Iglog according to the operating state of the variable intake valve-actuating mechanism 40 and the actual compression ratio Cr.

It should be noted that the present invention is not limited to the preferred embodiment described above, but it can be practiced in various forms. Although in the above-described embodiment, the net mean effective pressure Pme is set according to the maximum lift Liftin etc., this is not limitative, but e.g. by detecting the pressure in the cylinder 3a and the shaft torque of the engine 3, the net mean effective pressure Pme may be calculated based on these parameters. Further, although in the embodiment, the ratio of the net mean effective pressure Pme to the maximum mean effective pressure Pme_max is used as the torque ratio, this is not limitative, but the inverse thereof may be used. Furthermore, although in the present embodiment, both the net mean effective pressure Pme and the maximum mean effective pressure Pme_max are calculated according to the maximum lift Liftin, the cam phase Cain, and the compression ratio Cr, it is to be understood that one of them may be calculated.

Although in the above-described embodiment, as the output torque parameter indicative of output torque and the compression ratio parameter indicative of compression ratio, the net mean effective pressure Pme and the compression ratio Cr are used, respectively, this is not limitative, but other suitable parameters, such as the indicated mean effective pressure and the target compression ratio Cr_cmd may be used, respectively. Further, although in the embodiment, as the operating state parameter indicative of the operating state of the variable valve actuating mechanism, the maximum lift Liftin and the cam phase Cain are used, respectively, this is not limitative, but other suitable parameters, such as the target maximum lift Liftin_cmd and the target cam phase Cain_cmd may be used, respectively.

Although the above-described embodiment is an example in which the engine 3 is provided with three variable mechanisms, this is not limitative, but the engine 3 may be not provided with any variable mechanisms, or the number of variable mechanisms may be one or two. Further, although the variable intake valve-actuating mechanism 40 in the above-described embodiment is of a type which changes both the opening timing and the closing timing of the intake valves 4, this is not limitative, but it may be of a type which changes only one of the opening timing and the closing timing of the intake valves while holding the maximum lift Liftin constant, by using e.g. a solenoid. In such a case as well, it is possible to obtain the effects described above. Further, although in the above-described embodiment, the variable valve lift mechanism 50 is employed which advances the opening timing of the intake valves 4 and retards the closing timing of the same as the maximum valve lift is larger, this is not limitative, but a type may be employed which changes the maximum lift Liftin without changing the opening timing or the closing timing of the intake valves 4.

Further, although the above-described embodiment is an example of the present invention being applied to the engine 3 installed on a vehicle, this is not limitative, but the present invention may be applied to various types of internal combustion engine for industrial use including, a ship propulsion engine, such as an outboard engine, which has a vertically-installed crankshaft.

It is further understood by those skilled in the art that the foregoing are preferred embodiments of the invention, and that various changes and modifications may be made without departing from the spirit and scope thereof.

What is claimed is:

1. An ignition timing control system for controlling ignition timing of an internal combustion engine, comprising:
   rotational speed-detecting means for detecting rotational speed of the engine;
   maximum torque parameter-calculating means for calculating a maximum torque parameter indicative of maximum torque that the engine can output when the engine is at the detected rotational speed, according to the detected rotational speed;
   output torque parameter-calculating means for calculating an output torque parameter indicative of output torque being output from the engine;
   torque ratio-calculating means for calculating a torque ratio as a ratio of one of the calculated maximum torque parameter and the output torque parameter to the other; and
   ignition timing-determining means for determining the ignition timing according to the rotational speed of the engine and the calculated torque ratio.

2. An ignition timing control system as claimed in claim 1, wherein the engine is provided with a variable valve actuating mechanism that is capable of changing at least one of a maximum valve lift of an intake valve, opening timing of the intake valve, and closing timing of the intake valve,
   the ignition timing control system further comprising operating state parameter-detecting means for detecting an operating state parameter indicative of an operating state of the variable valve actuating mechanism,
   wherein at least one of the maximum torque parameter and the output torque parameter is calculated according to the detected operating state parameter.

3. An ignition timing control system as claimed in claim 1 or 2, wherein the engine is provided with a variable compression ratio mechanism that is capable of changing compression ratio of the engine, the ignition timing control system further comprising compression ratio parameter-detecting means for detecting a compression ratio parameter indicative of the compression ratio, wherein at least one of the maximum torque parameter and the output torque parameter is calculated according to the detected compression ratio parameter.

4. A method of controlling ignition timing of an internal combustion engine, comprising the steps of:

detecting rotational speed of the engine;

calculating a maximum torque parameter indicative of maximum torque that the engine can output when the engine is at the detected rotational speed, according to the detected rotational speed;

calculating an output torque parameter indicative of output torque being output from the engine;

calculating a torque ratio as a ratio of one of the calculated maximum torque parameter and the output torque parameter to the other; and determining the ignition timing according to the rotational speed of the engine and the calculated torque ratio.

5. A method as claimed in claim 4, wherein the engine is provided with a variable valve actuating mechanism that is capable of changing at least one of a maximum valve lift of an intake valve, opening timing of the intake valve, and closing timing of the intake valve, the method further comprising the step of detecting an operating state parameter indicative of an operating state of the variable valve actuating mechanism, wherein at least one of the maximum torque parameter and the output torque parameter is calculated according to the detected operating state parameter.

6. A method as claimed in claim 4 or 5, wherein the engine is provided with a variable compression ratio mechanism that is capable of changing compression ratio of the engine, the method further comprising the step of detecting a compression ratio parameter indicative of the compression ratio, wherein at least one of the maximum torque parameter and the output torque parameter is calculated according to the detected compression ratio parameter.

7. An engine control unit including a control program for causing a computer to control ignition timing of an internal combustion engine, wherein the control program causes the computer to detect rotational speed of the engine, calculate a maximum torque parameter indicative of maximum torque that the engine can output when the engine is at the detected rotational speed, according to the detected rotational speed, calculate an output torque parameter indicative of output torque being output from the engine, calculate a torque ratio as a ratio of one of the calculated maximum torque parameter and the output torque parameter to the other, and determine the ignition timing according to the rotational speed of the engine and the calculated torque ratio.

8. An engine control unit as claimed in claim 7, wherein the engine is provided with a variable valve actuating mechanism that is capable of changing at least one of a maximum valve lift of an intake valve, opening timing of the intake valve, and closing timing of the intake valve, wherein the control program causes the computer to detect an operating state parameter indicative of an operating state of the variable valve actuating mechanism, and wherein at least one of the maximum torque parameter and the output torque parameter is calculated according to the detected operating state parameter.

9. An engine control unit as claimed in claim 7 or 8, wherein the engine is provided with a variable compression ratio mechanism that is capable of changing compression ratio of the engine, wherein the control program causes the computer to detect a compression ratio parameter indicative of the compression ratio, and wherein at least one of the maximum torque parameter and the output torque parameter is calculated according to the detected compression ratio parameter.

\* \* \* \* \*